(12) United States Patent
Prior

(10) Patent No.: US 11,085,197 B2
(45) Date of Patent: Aug. 10, 2021

(54) COMPOSITE BASED LEADING EDGE KIT FOR A POOL AND/OR SPA COVER SYSTEM

(71) Applicant: Priority Electric Inc., New Britain, CT (US)

(72) Inventor: Michael P. Prior, Berlin, CT (US)

(73) Assignee: Priority Electric Inc., New Britain, CT (US)

( * ) Notice: Subject to any disclaimer, the term of this patent is extended or adjusted under 35 U.S.C. 154(b) by 0 days.

(21) Appl. No.: 17/077,162

(22) Filed: Oct. 22, 2020

(65) Prior Publication Data
US 2021/0123254 A1 Apr. 29, 2021

Related U.S. Application Data

(60) Provisional application No. 63/024,899, filed on May 14, 2020, provisional application No. 62/925,152, filed on Oct. 23, 2019.

(51) Int. Cl.
*E04H 4/14* (2006.01)
*B29C 70/02* (2006.01)
(Continued)

(52) U.S. Cl.
CPC ............ *E04H 4/14* (2013.01); *B29C 70/021* (2013.01); *B29C 70/16* (2013.01); *E04H 4/101* (2013.01); *Y10T 428/13* (2015.01)

(58) Field of Classification Search
CPC .. E04H 4/14; E04H 4/101; E04H 4/00; B29C 70/021; B29C 70/16; B29C 70/34;
(Continued)

(56) References Cited

U.S. PATENT DOCUMENTS

| | | | |
|---|---|---|---|
| 4,466,143 | A | 8/1984 | Lamb |
| 5,303,527 | A | 4/1994 | Perez et al. |
| 5,810,281 | A | 9/1998 | Kole |
| 7,171,703 | B2 | 2/2007 | Mathis |
| 7,325,259 | B2 | 2/2008 | Wood |

(Continued)

OTHER PUBLICATIONS

International Search Report and Written Opinion, International Appliction No. PCT/US2020/057044, dated Jan. 27, 2021.

*Primary Examiner* — Camie S Thompson
(74) *Attorney, Agent, or Firm* — Perman & Green, LLP

(57) ABSTRACT

Provided is a pool and/or spa cover leading edge kit for use with a pool and/or spa cover system. The kit includes at least two annular shaped fiber reinforced polymer composite segments capable of being axially aligned and interconnected at their abutting ends with each annular shaped fiber reinforced polymer composite segment having an axial length of from 3 feet to 20 feet. The kit also includes at least one joiner capable of interconnecting together a pair of abutting axially aligned annular shaped fiber reinforced polymer composite segments at their axial ends to form a segmented leading edge with an overall axial length of from 6 feet to 50 feet that is capable of being coupled to a pool and/or spa cover. The at least two annular shaped fiber reinforced polymer composite segments of the segmented leading edge include at least one of continuous fibers or discontinuous fibers oriented at least partially in the axial direction and encapsulated by a thermoset or thermoplastic resin matrix. After installation on the pool or spa, the segmented leading edge provides a deflection across the width of the pool or spa of from 0 to less than or equal to 0.10 inches per 10 feet of width of the pool or spa, and has a linear weight per foot of from 4 to 14 ounces per foot of axial length.

30 Claims, 14 Drawing Sheets

(51) Int. Cl.
*E04H 4/10* (2006.01)
*B29C 70/16* (2006.01)

(58) Field of Classification Search
CPC ..... B29C 70/02; B29C 66/71; B29C 66/5227; B29C 66/53261; B29C 66/1122; Y10T 428/13; Y10T 29/49373; B32B 1/08; B32B 3/06; B32B 3/00; B32B 3/20; B32B 3/26; B32B 2262/101; B32B 2262/103; B32B 2262/105; B32B 15/08; F21W 2131/401; Y10S 242/919; F24S 10/17; B65H 75/28; B65H 75/22; B65H 2701/5136; B65H 2701/31; B65H 2701/5122; B65H 75/14; B29K 2105/10; B29K 2105/258
USPC ..... 428/34.1; 242/388.6, 407, 118.32, 614.1, 242/919, 609.1; 4/498, 502, 101, 88, 86
See application file for complete search history.

(56) References Cited

U.S. PATENT DOCUMENTS

| | | |
|---|---|---|
| 7,861,471 B2 | 1/2011 | Smith |
| 9,328,524 B1 | 5/2016 | Cuellar |
| 9,593,499 B1 | 3/2017 | Barba, III |
| 9,677,293 B2 | 6/2017 | Stien et al. |
| 9,777,495 B2 | 10/2017 | Moody |
| 10,214,929 B2 | 2/2019 | Stone, Jr. |
| 2005/0091736 A1 | 5/2005 | Smith |
| 2005/0097834 A1 | 5/2005 | King et al. |
| 2010/0122407 A1 | 5/2010 | Dewyea et al. |
| 2011/0011008 A1 | 1/2011 | Dagher et al. |
| 2018/0119441 A1 | 5/2018 | Livingston |
| 2018/0195647 A1 | 7/2018 | Berger et al. |

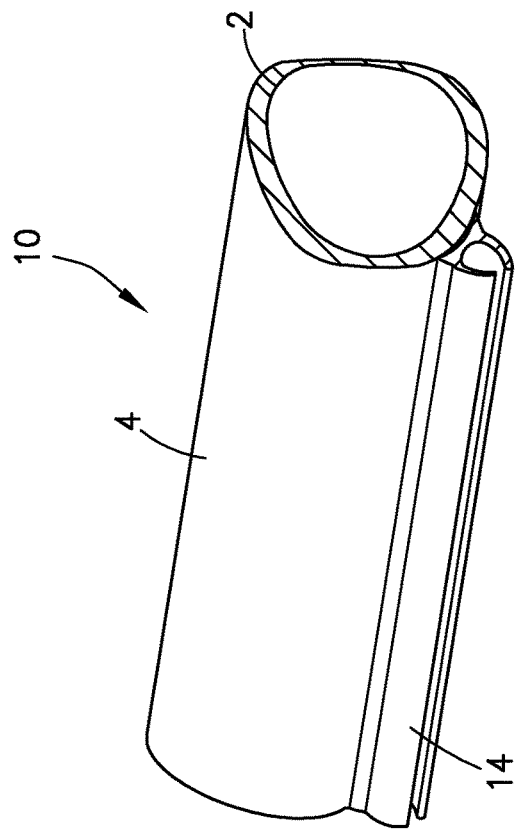
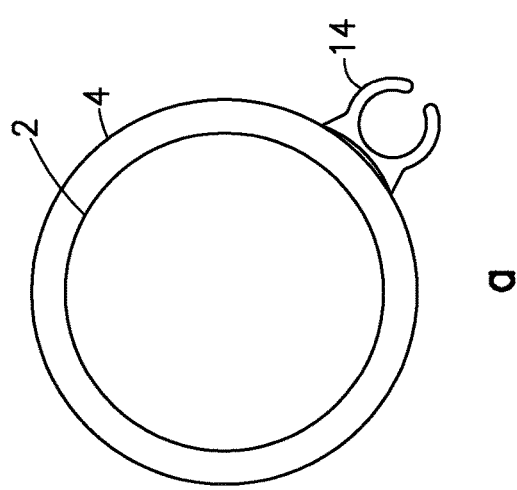
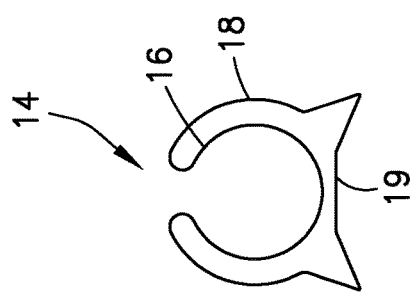
FIG.4
FIG.5

COMPOSITE BASED LEADING EDGE KIT FOR A POOL AND/OR SPA COVER SYSTEM

CROSS-REFERENCE TO RELATED APPLICATIONS

This application claims the benefit of U.S. Provisional Application No. 62/925,152 filed on Oct. 23, 2019, the entire contents of which are incorporated herein by reference, and U.S. Provisional Application No. 63/024,899 filed on May 14, 2020, the entire contents of which are also incorporated herein by reference.

FIELD

The disclosure relates to pool and spa covers and cover systems. It more particularly relates to composite based leading edge kits for pool and spa cover systems. It still more particularly relates to fiber reinforced polymer composite based leading edge kits for pool and spa covers and automated and manual cover systems that provide for near zero or minimal deflection of the leading edge when covering a wide pool and/or spa.

BACKGROUND

Swimming pools and spas are commonly covered to minimize water evaporation, to prevent debris from entering the pool or spa, to preserve chemical treatments in the water, to retain the temperature of the water by providing an insulating effect, and to heat the pool or spa in the case of a solar cover. An automatic pool cover provides convenience for a user by allowing the cover to be easily extended over the pool or spa during periods of non-use and retracted during periods of use. Typically, automatic pool covers utilize a parallel track assembly built into the side walls of the pool for guiding the leading edge of the cover as it traverses the length of the pool. Such track assemblies extend along the length of the pool, wherein the cover is moved via a cable-driven system to slide along the tracks and cover the pool. The leading edge for the pool or spa cover attaches to the front end of the pool or spa cover and helps guide the pool or spa cover across the length and width of the pool or spa during the opening and closing operation of the cover.

The pool or spa cover extends the width of the pool or spa and its leading edge is typically made of aluminum. The leading edge is used to lift the front edge of the fabric or cover material for the pool or spa cover across the width of the pool or spa. The leading edge is also used to maintain tension on the fabric or cover material while the cover moves in any direction during the opening and closing of the pool or spa cover. More particularly, the leading edge needs to maintain consistent and uniform tension on the cover with minimal deflection as the cover is retrieved and rolled onto the drum while uncovering the pool or spa.

One problem with aluminum leading edges is that they undergo significant sag and downward deflection for pools or spas of greater than 20 feet in width. This prevents the leading edge of the pool cover from staying above the water level, and hence easily traversing the length of the pool for automated pool covers. It also results in uneven or non-uniform tension on the pool or spa cover material during the opening and closing operation, which results in increased load and stress on the motor/drive system used to move the pool or spa cover. Also, the excessive downward deflection affects housing the leading edge by placing an architectural requirement to have excessive drop (distance between coping and water level) so the deflecting leading edge can be housed when in its final opened or closed positions. Pool designers and builders have attempted to resolve this downward deflection issue for wider pools and longer leading edges by using larger diameter aluminum tubing for the leading edge. However this creates other problems, such as increased weight for the leading edge and the overall pool cover system (which requires a large motor and drive system), and a greater drop required between the coping of the pool and the water level in the pool (in order to hide the leading edge underneath the coping), which takes away from the aesthetic qualities of the pool by having more tile exposed. Leading edges fabricated from aluminum are also easily susceptible to pitting from electrolysis induced by chlorinated water. In the closed position, and often in its fully opened position, the leading edge of the pool cover needs to be positioned under the coping of the pool and above surface of the water of the pool for the entire width of the pool.

Another problem with aluminum leading edges is that they require "electrical bonding" because of the electrical conductivity of the aluminum leading edge. Bonding is a safety precaution that physically connects locally exposed electrically conductive materials (objects) together, such as aluminum, copper, steel, and other metals in general, in effort to remove the potential voltage differences between these materials (objects) as well as prevent any electrical current from being generated. As a result of bonding, if a person later touches two or more objects simultaneously that are bonded together they will not be shocked since there is no voltage potential between those two objects. With "bonding" in this application, one end of a copper wire mesh strip is embedded (fastened, threaded, soldered, welded, or alike) to the metal surface of the leading edge pool cover while the other end of the copper wire mesh strip is connected in the same or similar manner to the metal pool cover drum. The copper wire mesh strip is integral to the pool cover. As a result, the aluminum leading edge pool cover is at the same potential electrical voltage as the pool cover drum thus avoiding shock or electrical current from being generated. If a non-conductive leading edge was available, pool covers would not require bonding which would reduce the cost and complexity of the pool cover.

Hence, there is a need for a lightweight corrosion resistant leading edge kit for a pool and/or spa cover that can easily be assembled at the pool site and that does not require "bonding" while also providing for less sag or downward deflection relative to prior art leading edges used for pool covers. Such a leading edge kit would allow for a smaller drop between the coping and the surface of the water of the pool or spa in order to easily hide the leading edge of the pool cover under the coping of the pool when the cover is in the closed position or the open position. There is also a need for a leading edge kit for use with a pool or spa cover system that will allow for more evenly distributed tension and control of the pool or spa cover material during the opening and closing operations of the pool or spa cover.

SUMMARY

This disclosure provides for improved leading edge kits that provide leading edges for pool and spa covers that are of increased rigidity, less susceptible to corrosion from electrolysis, less susceptible to downward deflection, lighter in weight and do not require "bonding." This disclosure also provides for a pool and spa cover system including a leading edge for the pool and spa cover that is of increased rigidity, less susceptible to downward deflection and corrosion and does not require "bonding." This disclosure further provides for a method of reducing the downward deflection of a leading edge for a pool and spa cover. In addition, this disclosure provides a leading edge for a pool or spa cover that provides for more uniform and stable tension on the cover during the opening and closing operations of the cover.

This disclosure relates in part to a pool and/or spa cover leading edge kit comprising: at least two annular shaped fiber reinforced polymer composites capable of being axially aligned and interconnected at abutting ends with each annular shaped fiber reinforced polymer composite having an axial length of from 3 feet to 20 feet, at least one joiner capable of interconnecting together a pair of axially aligned annular shaped fiber reinforced polymer composites at abutting axial ends to form a segmented leading edge with an axial length of from 6 feet to 50 feet that is capable of being coupled to a pool and/or spa cover, wherein the at least two annular shaped fiber reinforced polymer composites include at least one of continuous fibers or discontinuous fibers oriented at least partially in the axial direction and encapsulated by a thermoset or thermoplastic resin matrix. The segmented leading edge is capable of being coupled to a pool and/or spa cover and provides a no-load deflection across the width of the pool and/or spa of from 0 to less than or equal to 0.10 inches per 10 feet of width of the pool and/or spa, and wherein the segmented leading edge has a linear weight per foot of from 4 to 14 ounces per foot of axial length.

This disclosure also relates in part to a method of reducing the deflection of a leading edge for a pool or spa cover comprising: providing a pool or spa cover leading edge kit to a pool or spa site, the kit comprising: at least two annular shaped fiber reinforced polymer composites capable of being axially aligned and interconnected at abutting ends with each annular shaped fiber reinforced polymer composite having an axial length of from 3 feet to 20 feet, at least one joiner capable of interconnecting together a pair of axially aligned annular shaped fiber reinforced polymer composites at abutting axial ends to form a segmented leading edge with an axial length of from 6 feet to 50 feet that is capable of being coupled to a pool or spa cover, wherein the at least two annular shaped fiber reinforced polymer composites include at least one of continuous fibers or discontinuous fibers oriented at least partially in the axial direction and encapsulated by a thermoset or thermoplastic resin matrix; assembling the leading edge kit at the pool or spa site to provide an assembled leading edge that is about equal in length to the width of the pool or spa cover; coupling the assembled leading edge to the front end of the pool or spa cover; wherein the assembled and coupled leading edge provides a deflection across the width of the pool or spa of from 0 to less than or equal to 0.10 inches per 10 feet of width of the pool or spa, and wherein the assembled and coupled leading edge has a linear weight per foot of from 4 to 14 ounces per foot of axial length.

This disclosure also relates in part to a pool and/or spa cover leading edge comprising: a fiber reinforced polymer composite with an axial length from 5 feet to 50 feet (based on the width of the pool or spa), wherein the composite includes at least one of continuous fibers or discontinuous fibers oriented at least partially in the axial direction, and wherein the at least one of continuous fibers or discontinuous fibers are encapsulated by a thermoset or thermoplastic resin matrix to provide a leading edge for coupling to a pool and/or spa cover. The pool and/or spa cover leading edge when coupled to a pool and/or spa cover provides a no-load deflection across the width of the pool and/or spa of from 0 to less than or equal to 0.10 inches per 10 feet of width of the pool and/or spa, and wherein the leading edge has a linear weight per foot of from 4 to 14 ounces per foot of axial length.

This disclosure also relates in part to a pool and/or spa cover system for a pool and/or spa comprising: a pool and/or spa cover, a leading edge coupled to the front end of the pool and/or spa cover, wherein the leading edge comprises a fiber reinforced polymer composite with an axial length from 5 feet to 50 feet (based on the width of the pool or spa), wherein the composite includes at least one of continuous fibers or discontinuous fibers oriented at least partially in the axial direction, and wherein the at least one of continuous fibers or discontinuous fibers are encapsulated by a thermoset or thermoplastic resin matrix to provide a leading edge for coupling to a pool and/or spa cover that provides a no-load deflection across the width of the pool and/or spa of from 0 to less than or equal to 0.100 inches per 10 feet of width of the pool and/or spa and wherein the leading edge has a linear weight per foot of from 4 to 14 ounces per foot of axial length, a roller drum coupled to the back end of the pool and/or spa cover for storing, winding and unwinding the pool and/or spa cover, a drive assembly including an electric or hydraulic motor coupled to the roller drum for rotating the roller drum in the forward and reverse direction, a parallel track channel assembly coupled to the side walls of the pool and/or spa between the surface of the water and the coping for guiding the pool and/or spa cover across the length of the pool and/or spa, a pump for removing water from the top surface of the pool cover when in the closed position and a control assembly for the drive assembly for providing a user interface for the opening or closing of the pool and/or spa cover.

This disclosure further relates in part to a method of reducing the downward deflection of a leading edge for a pool and spa cover comprising: providing a pool and/or spa cover with a leading edge coupled to the to the front end of the pool and/or spa cover, wherein the leading edge comprises a fiber reinforced polymer composite with an axial length from 5 feet to 50 feet (based on the width of the pool or spa), wherein the composite includes at least one of continuous fibers or discontinuous fibers oriented at least partially in the axial direction, and wherein the at least one of continuous fibers or discontinuous fibers are encapsulated by a thermoset or thermoplastic resin matrix, and upon opening or closing the pool and/or spa cover, the no-load deflection of the leading edge coupled to the pool and/or spa cover across the width of the pool and/or spa ranges from 0 to less than or equal to 0.10 inches per 10 feet of width of the pool and/or spa and wherein the leading edge has a linear weight per foot of from 4 to 14 ounces per foot of axial length.

It has been surprisingly found that, in accordance with this disclosure, that a leading edge for a pool or spa cover comprising a fiber reinforced polymer composite having at least one of continuous fibers or discontinuous fibers oriented at least partially in the axial direction with the fibers encapsulated by a thermoset or thermoplastic resin matrix provides for enhanced stiffness and reduced downward deflection (0 to less than or equal to 0.10 inches per 10 feet of width of the pool and/or spa under no-load). The leading edges are also of reduced weight having a linear weight per foot of from 4 to 14 ounces per foot of axial length. These advantages allow for leading edges having axial lengths ranging from 5 to 50 feet to be used for pool and spa covers. The axial length of the leading edge is just under overall width of the pool or spa such that the pool or spa cover spans the entire width and length of the pool or spa to completely cover it.

Other objects and advantages of the present disclosure will become apparent from the detailed description and drawings that follow.

BRIEF DESCRIPTION OF THE DRAWINGS

FIGS. 4a. and b. depicts a cross-sectional and a perspective view of an annular shape leading edge of the instant disclosure with a luff groove as a separate piece attached to the leading edge.

FIG. 5 depicts a cross-sectional view of a luff groove as a separate piece for attachment to a leading edge in the form of a fiber reinforced polymer composite of the instant disclosure.

DETAILED DESCRIPTION

Figure 1:
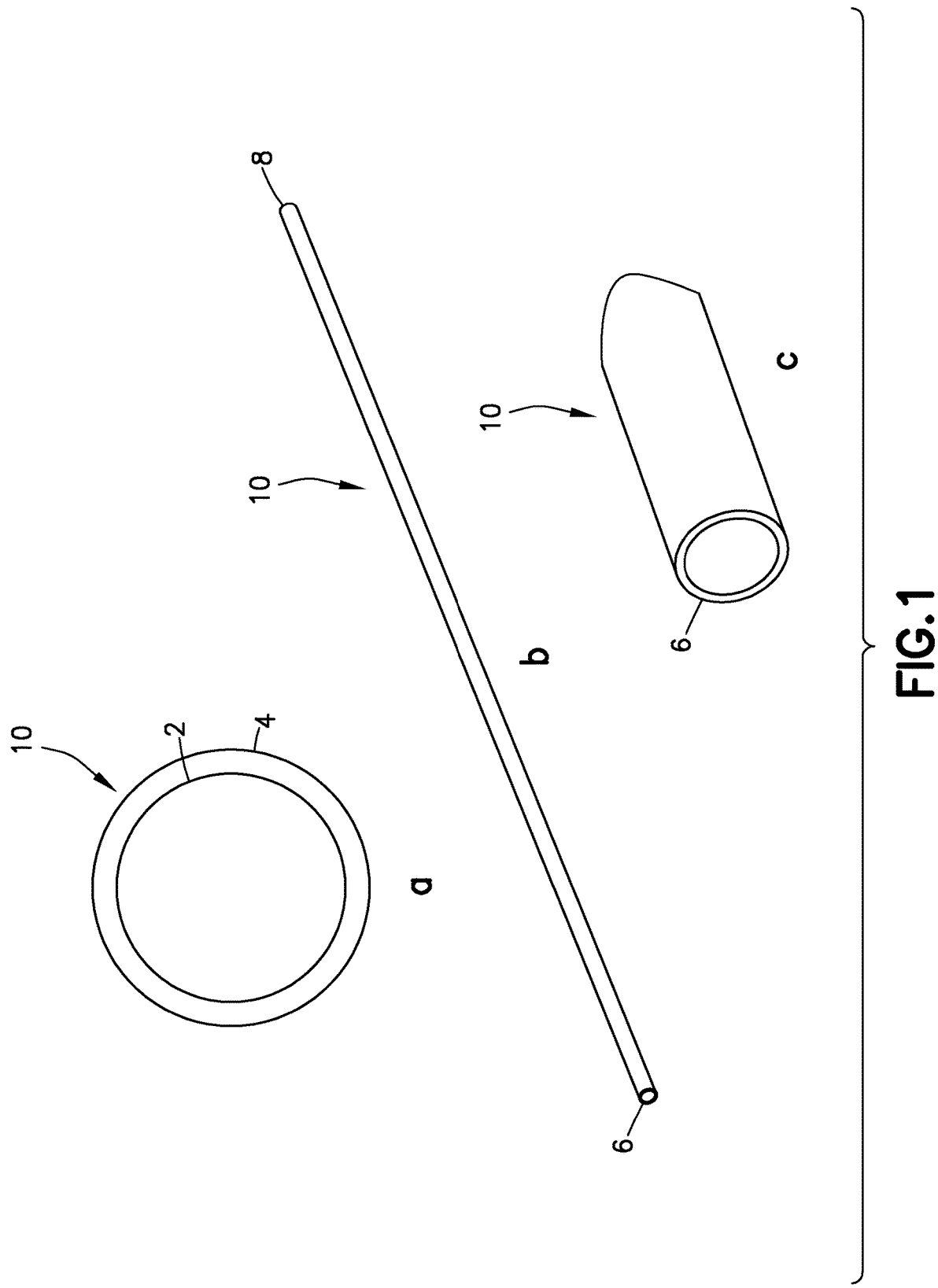
FIG. 1a. to c. depicts a cross-sectional view and perspective views of an annular shaped leading edge of the instant disclosure.

Although the present disclosure will be described with reference to the embodiments shown in the drawings, it should be understood that the present exemplary embodiments can be used individually or in any suitable combination thereof. Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. In addition, any suitable size, shape or type of elements or materials could be used for the leading edges and pool cover systems disclosed herein. All numerical values within the detailed description and the claims herein are modified by "about" or "approximately" the indicated value, and take into account experimental error and variations that would be expected by a person having ordinary skill in the art.

Fiber Composites of the Instant Disclosure

As used herein, "composite" is defined as a material consisting of two or more chemically distinct constituents, on a macroscale, having a distinct interface separating them. The composites disclosed herein consist of one or more discontinuous phases embedded in a continuous phase. The fiber composites disclosed herein include a fiber based discontinuous phase embedded in a continuous phase. The fiber based discontinuous phase is typically harder, stiffer and stronger than the continuous phase and is also called the reinforcement or reinforcing material, wherein the continuous phase is referred to as the matrix. The fiber composites disclosed herein utilize a polymer matrix as the continuous phase. For the fiber composites disclosed herein, the geometry of the reinforcing fibers may be described by size, shape and size distribution.

In addition, the fiber-based composites disclosed herein may differ in fiber concentration, concentration distribution and orientation. Fiber concentration may be measured by volume fraction or weight fraction of fibers relative to the polymeric matrix material. The fiber concentration distribution is a measure of homogeneity or uniformity of the system. The orientation of the reinforcing fibers for the fiber composites disclosed herein impact the isotropy of the matrix, and critically the anisotropy of the composite system. The fiber composites disclosed herein preferably include a continuous fiber phase, such as unidirectional or cross-ply composites, which may introduce anisotropy to the composite.

The fiber composites for leading edges disclosed herein may be single-layer or multilayer (angle-ply) composites. The single-layer composites may be made from several distinct layers with each layer having the same orientation and properties, and the entire laminate considered a "single-layer" composite. Single-layer composites also refer to molded composites made with discontinuous fibers because even though the fiber orientation may not be uniform through the thickness, there are no distinct layers. The multilayer (angle-ply) composites for the leading edges disclosed herein may include two or more layers or lamina of fibrous composites that are bonded together with the matrix material. The two or more layers may be the same or different in terms of fiber orientation, however when the layers are bonded together a multilayer composite is formed. The multilayer fiber reinforced polymer composites disclosed herein may include two, or three, or four, or five, or six, or seven, or eight layers, or more layers of lamina with the thickness of each layer or lamina being from 0.01 to 1 mm, or 0.02 to 0.8 mm, or 0.05 to 0.6 mm, or 0.07 to 0.4 mm, or 0.1 to 0.3 mm, or 0.15 to 0.25 mm.

When two or more layers in a multilayer composite are of different materials (fiber types), a hybrid or heterogeneous laminate structure is formed. The multilayer fiber reinforced polymer composites of the instant disclosure preferably have a hybrid laminate structure.

The fiber reinforced polymer composites disclosed herein may be formed with long continuous fibers and are referred to as continuous fiber reinforced polymer composites. Alternatively, the fiber reinforced polymer composites disclosed herein may be formed with short discontinuous fibers and are referred to as discontinuous fiber reinforced polymer composites. For continuous fiber reinforced polymer composites in the form of a single-layer composite, the continuous fibers may be all aligned in one direction to form a unidirectional composite. Such unidirectional composites are made by laying the continuous fibers parallel to each other and saturating them with the polymeric binder material, which holds the fibers in position and serves as the matrix material. Such forms of preimpregnated fibers are referred to herein a "unidirectional prepregs."

In an alternative form, continuous fiber reinforced composites may be made by utilizing continuous fibers oriented in two-directions (axial and transverse direction) to form a bi-directional composite. Such bi-directional composites are made by laying the continuous fibers in a cross-wise orientation relative to each other (for example, using a cross-ply or woven or braided fiber configuration or lay-up) and saturating them with the polymeric binder material, which holds the fibers in position and serves as the matrix material. Such forms of preimpregnated fibers are referred to herein a "bi-directional prepregs." Bi-directional prepregs allow for controlled anisotropy by allowing the ratio of property values in different directions to be tailored. The fiber reinforced polymer composites disclosed herein are preferably formed from bi-directional prepregs that allow for controlled anisotropy of property values (for example, when shaped into a tube geometry with the axial fibers oriented in parallel with the tube axial direction and the transverse fibers oriented in the tube tangential/hoop direction), and in particular strength and stiffness to achieve the improved deflections of the leading edges disclosed herein.

There are a multitude of fiber architectures, fiber orientations, fiber layups, and composite schedules that can be designed and fabricated to achieve the inventive fiber composites for leading edges disclosed herein. In particular, it has been discovered that fibers on the tube's outer surface undergo the highest stresses, while fibers on the tube's inner surface undergo less stress, which necessitates that the fiber design utilizes the axial fibers through the majority of the tube wall thickness to achieve the axial stiffness necessary to achieve the improved deflections of the inventive leading edges.

The transverse fibers, when oriented in the inventive tube structure, are considered as the tangential (hoop) fibers and are used to maintain structural integrity (for example, utilizing the bi-directional pre-preg). Braided and/or woven fabrics may be used to increase the structural integrity of the leading edge, yet the inventive design must numerically (as disclosed below) provide for sufficient axial fibers to achieve the required axial stiffness needed. The fiber architecture of the inventive fiber composites for the leading edges disclosed herein are based on a combination of the fiber orientation, fiber location, fiber strength, fiber stiffness, and fiber cost considerations. For the inventive, multilayer composites disclosed herein, medium stiff fibers may be located at the outer surface of the tube to provide the needed axial stiffness to achieve unexpected low deflections for a certain outer tube diameter requirement, while still providing higher stiffness at the outer surface to allow for a tube with a smaller outer diameter. The type and orientation of the fibers used at inner surface of the tube is less critical. For example, fibers of lower stiffness with a lower volume percent oriented in the axial direction may be used adjacent or at the inner surface of the leading edge tube design.

Leading Edge of the Instant Disclosure

The leading edge of a pool cover extends across the entire width of a pool or spa and may alternatively be referred to as a front edge of a pool cover. It needs to be fabricated from a sufficiently stiff, rigid and tough material to allow for an automated or manual pool cover to be easily extended across the length of the pool or spa with near zero or minimal downward downward deflection and even upward deflection. The length of the pool or spa is greater than the width of the pool of spa.

It has been surprisingly discovered that when the leading edge of a pool cover is fabricated from a fiber reinforced polymer composite having at least one of continuous fibers or discontinuous fibers oriented at least partially in the axial direction with the fibers encapsulated by a thermoset or thermoplastic resin matrix, there is a significant reduction in the downward deflection or even upward deflection of the leading edge compared to prior art leading edges fabricated from aluminum. It has also been surprisingly discovered that when the leading edge of a pool cover is fabricated from a fiber reinforced polymer composite having at least one of continuous fibers or discontinuous fibers oriented at least partially in the axial direction with the fibers encapsulated by a thermoset or thermoplastic resin matrix, there is a significant reduction in the linear weight per foot of the leading edge compared to prior art leading edges fabricated from aluminum. The fiber reinforced polymer composite may be a single tube or alternatively may be made from two or more tubes connected together with one or more joiners connecting together the axial ends of the two or more tubes. It has also been surprisingly discovered that when the fiber reinforced polymer composite leading edge is made from two or more tubes including one or more joiners, there is a surprising and unexpected synergistic reduction in the overall deflection of the leading edge compared to a comparable leading edge fabricated from a single tube. That is, it is possible to provide leading edges that upwardly deflect ("frown" shape) as opposed to downwardly deflect ("smile" shape), and in particular has a greater propensity to do so when the fiber reinforced polymer composite leading edge is made from two or more tubes including one or more joiners. In addition, the leading edge kit for a pool or spa cover disclosed herein provides for more uniform and stable tension on the pool or spa cover during the opening and closing operations of the cover, which lessens the load on the motor/drive system used to transport the cover and the leading edge to and from a drum located at one end of the pool or spa, which therefore improves the life and reliability of the motor/drive system.

In particular, the leading edges (single tube or two or more tubes connected with joiners) of the instant disclosure provide for a downward deflection under no load from horizontal ranging from 0 to 0.250 inches per 10 feet of width of the pool, or a deflection ranging from 0 to 0.200 inches per 10 feet of width of the pool, or a deflection ranging from 0 to 0.175 inches per 10 feet of width of the pool, or a deflection ranging from 0 to 0.150 inches per 10 feet of width of the pool, or a deflection ranging from 0 to 0.125 inches per 10 feet of width of the pool, or a deflection ranging from 0 to 0.100 inches per 10 feet of width of the pool, or a deflection ranging from 0 to 0.075 inches per 10 feet of width of the pool, or a deflection ranging from 0 to 0.050 inches per 10 feet of width of the pool, or a deflection ranging from 0 to 0.025 inches per 10 feet of width of the pool, or a deflection ranging from 0 to 0.010 inches per 10 feet of width of the pool, or a deflection ranging from 0 to 0.005 inches per 10 feet of width of the pool. The phrase "no-load" as it relates to the deflection used in the instant disclosure means that the leading edge is not subjected to an additional external load, but only the force of gravity from its own weight when the deflection is measured. For the purposes of the instant disclosure, "downward" deflection means in the direction of gravity and is also referred to herein as positive deflection or in the positive direction. Also for the purposes of the instant disclosure, "upward" deflection means in the opposite direction from gravity and is also referred to herein as negative deflection or in the negative direction. The absolute value of the deflection of the leading edges of the instant disclosure allow for deflection to occur in both the positive direction (downward deflection) and the negative direction (upward deflection). In the instant disclosure, including the claims, when the deflection direction is not specifically indicated (either upward or downward), it means that the deflection may occur in either the downward direction, the upward direction or both directions. So this would be akin to an absolute value for the deflection (irrespective of downward positive direction or upward negative direction).

In addition, the leading edges (single tube or two or more tubes connected with joiners with joiners) of the instant disclosure provide for a downward deflection from horizontal under a water load of 50 pounds (6 gallons of water) ranging from to 1.250 inches per 10 feet of width of the pool, or a deflection ranging from 0 to 1.00 inches per 10 feet of width of the pool, or a deflection ranging from 0 to 0.875 inches per 10 feet of width of the pool, or a deflection ranging from 0 to 0.750 inches per 10 feet of width of the pool, or a deflection ranging from 0 to 0.625 inches per 10 feet of width of the pool, or a deflection ranging from 0 to 0.500 inches per 10 feet of width of the pool, or a deflection ranging from 0 to 0.375 inches per 10 feet of width of the pool, or a deflection ranging from 0 to 0.250 inches per 10 feet of width of the pool, or a deflection ranging from 0 to 0.125 inches per 10 feet of width of the pool, or a deflection ranging from 0 to 0.050 inches per 10 feet of width of the pool, or a deflection ranging from 0 to 0.025 inches per 10 feet of width of the pool. The phrase "water load of 50 pounds (6 gallons of water)" as it relates to the deflection used in the instant disclosure means that the leading edge is subjected to an additional external load of 50 pounds (6 gallons of water) in addition to the force of gravity from its own weight when the deflection is measured.

The reduced deflection for the leading edges of the instant disclosure permit automated pool covers to be used on wider pools that would otherwise not be possible using traditional aluminum leading edges. The reduced deflection of the leading also results in more uniform and stable tension on the material used for the cover, which makes for the opening and closing operations of the cover to be smoother and easier in terms of the load that needs to be provided by the motor/drive system on the drum for the cover. There has been a long felt need in the pool and spa design and construction industry for such leading edges with reduced deflection in order to accommodate wide pools and/or spas. In addition, there has been a great deal of skepticism from those skilled in the art of pool and spa design and construction of being able to design, fabricate, install and operate an effective leading edge for an automated pool cover of greater than 30 feet in width.

The leading edges of the instant disclosure may be effectively utilized on either automated or non-automated (manual) pool and spa covers ranging in width from 5 to 100 feet, or 10 to 90 feet, or 15 to 85 feet, or 20 to 80 feet, or 25 to 75 feet, or 30 to 70 feet, or 35 to 65 feet, or 40 to 60 feet. In addition, the leading edges of the instant disclosure may be utilized on pools and/or spas having lengths ranging from 10 to 200 feet, or 20 to 150 feet, or 30 to 100 feet, or 40 to 90 feet, or 50 to 85 feet, or 60 to 80 feet.

Another advantage of the leading edges of the instant disclosure is that they are lighter in weight than prior art aluminum leading edges of equivalent length and diameter. In particular, the leading edges of the instant disclosure are from 2% to 75% lighter in weight, or from 5 to 70% lighter in weight, or from 10 to 65% lighter in weight, or from 15 to 60% lighter in weight, or from 20% to 55% lighter in weight, or from 25% to 50% lighter in weight, or from 30% to 45% lighter in weight, or from 30% to 40% lighter in weight than prior art aluminum leading edges of equivalent length and diameter. The leading edges of the instant disclosure have a linear weight per foot ranging from 4 to 20 ounces per foot, or 5 to 18 ounces per foot, or 6 to 16 ounces per foot, or 7 to 15 ounces per foot, or 8 to 14 ounces per foot, or 8.5 to 13 ounces per foot, or 9 to 12 ounces per foot, or 9.5 to 11.5 ounces per foot, or 10 to 11 ounces per foot. The decreased weight allows for these inventive leading edges to be more easily transportable, easier to install and require a smaller motor and drive system for moving the pool cover between the open and closed position for automated pool cover systems.

The leading edge of a pool cover of the instant disclosure is fabricated from a fiber reinforced polymer composite having continuous fibers oriented at least partially in the axial direction, discontinuous fibers oriented at least partially in the axial direction, or a combination of both continuous and discontinuous fibers oriented at least partially in the axial direction. At least partially in the axial direction means that at least 20%, or at least 30%, or at least 40%, or at least 50%, or at least 60%, or at least 70%, or at least 80%, or at least 90%, or at least 95% of the fibers are arranged or oriented along the axial direction of the leading edge. Non-limiting exemplary continuous or discontinuous fiber types for the leading edge include carbon/graphite fibers, aramid fibers, s-glass fibers, e-glass fibers, liquid crystal polymer (LCP) fibers, cellulose fibers, polyester fibers, polyphenylene sulfide (PPS) fibers, polyether ether ketone (PEEK) fibers, polyethylene fibers, polypropylene fibers, fluoropolymer fibers, polyamide fibers, and combinations thereof. One preferred fiber type for the leading edges disclosed herein is carbon/graphite fiber.

Fiber tow material diameters used in the leading edges of the instant disclosure may range from 0.005 inches to 0.050 inches, or 0.010 inches to 0.040 inches, or 0.015 inches to 0.035 inches, or 0.020 inches to 0.030 inches. The diameters of pre-impregnated composite material thickness and respective fibers- and tows within the pre-impregnated composite material may range from 0.005 to 0.050 inches, or 0.010 inches to 0.040 inches, or 0.015 inches to 0.035 inches, or 0.020 inches to 0.030 inches. Composite material used in the leading edges of the instant disclosure may have a density range of 0.050 to 0.070 pounds per cubic inch, or 0.053 to 0.067 pounds per cubic inch, or 0.056 to 0.065 pounds per cubic inch, or 0.058 to 0.062 pounds per cubic inch.

When in the form of discontinuous fibers, the fibers may be, for example, chopped fibers, whisker fibers or additive fibers. These discontinuous fibers may range in length from 0.125 to 5 inches, or 0.25 to 4 inches, or 0.375 to 3 inches, or 0.5 to 2 inches, or 0.75 to 1.75 inches, or 1 to 1.5 inches. When in the form of continuous fibers, the fibers may be, for example, multifilament fibers or monofilament fibers that are in a braided, woven, or two-dimensional laminate layup configuration. Although the continuous fibers are at least partially oriented in the axial direction, they may also be further oriented in the transverse direction, the hoop direction and the out-of-plane direction.

The continuous fibers, the discontinuous fibers and combinations thereof of the leading edge of the present disclosure are encapsulated by a thermoset or thermoplastic resin matrix. Non-limiting exemplary thermoset resin matrices include polyester, epoxy, phenolic, vinyl ester, polyurethane, silicone, polyamide and polyamide-imide. Non-limiting exemplary thermoplastic resin matrices include polyester, polyamide, acrylonitrile butadiene styrene, polylactic acid, polycarbonate, polyether ether ketone, polyethylene, polypropylene, and polyvinyl chloride. Particularly preferred resin matrix polymers are epoxy and cross-linked polyester.

In terms of the loading of the continuous fibers or discontinuous fibers in the thermoset or thermoplastic resin matrix of the leading edge, the at least one of continuous fibers or discontinuous fibers may be included within the leading edge at greater than or equal to 25 wt. %, or greater than or equal to 30 wt. %, or greater than or equal to 35 wt. %, or greater than or equal to 40 wt. %, or greater than or equal to 45 wt. %, or greater than or equal to 50 wt. %, or greater than or equal to 55 wt. %, or greater than or equal to 60 wt. %, or greater than or equal to 65 wt. %, or greater than or equal to 70 wt. %, or greater than or equal to 75 wt. %, or greater than or equal to 80 wt. % of the leading edge. Particularly preferred fiber loadings in the leading edge are greater than or equal to 70 wt. %, or greater than or equal to 75 wt. %, or greater than or equal to 80 wt. % of the leading edge.

The leading edge of the instant disclosure may be of various shapes and configurations. Non-limiting exemplary cross-sectional shapes of the leading edge include annular, hollow square, hollow rectangular, c-shaped, u-shaped, I-shaped, H-shaped, hollow triangular, hollow tear drop, hollow air foil, hollow oval, hollow pentagonal, hollow, octagonal, hollow hexagonal, and hollow heptagonal. In one advantageous form, the cross-sectional shape of the leading edge is annular with an outside diameter ranging from 0.20 inches to 4 inches, or 0.25 inches to 3 inches, or 0.5 inches to 2.75 inches, or 0.75 inches to 2.5 inches, or 1.0 inches to 2.25 inches, or 1.25 inches to 2.0 inches, or 1.50 inches to 1.75 inches. For the various cross-sectional shapes of the leading edge, the wall thickness may range from 0.030 inches to 0.300 inches, or 0.050 inches to 0.250 inches, or 0.075 inches to 0.225 inches, or 0.10 inches to 0.20 inches, or 0.125 inches to 0.175 inches.

The leading edge for a pool cover of the instant disclosure may further include a UV inhibitor, absorber or stabilizer in order to maintain the mechanical properties and aesthetic properties of the device as a function of time due to the exposure to day light and sunlight. Non-limiting exemplary UV inhibitors, absorbers or stabilizers include carbon black, titanium dioxide, hydroxybenzophenone, hydroxyphenyl-benzotriazole, oxanilides, benzophenones, benzotriazoles, hydroxyphenyltriazines, nickel quenchers and hindered amine light stabilizers (HALS). The UV inhibitor, absorber or stabilizer may be added to the leading edge either as an additive to the thermoset or thermoplastic resin matrix of the fiber reinforced polymer composite or as a coating applied to the outside surfaces of the leading edge.

The leading edge for a pool or spa cover of the instant disclosure may further include a luff groove (sometimes also referred to as a Keder™ track) for attachment of the pool and/or spa cover to the leading edge. The luff groove is typically in the form of a slotted channel that the front lip of the pool or spa cover may be slid into in order to secure the cover to the leading edge. Non-limiting exemplary shapes of the luff groove include annular, c-shaped, hollow square, hollow rectangular, and hollow triangular. The luff groove may be formed integral to the leading edge or alternatively may be a separate piece attached to the leading edge with an adhesive, mechanical fasteners, rivets, screws or high strength bonding tape.

The leading edge for a pool or spa cover of the instant disclosure may be advantageously in the shape of a "frown" (defined as the leading edge being a greater distance from the horizontal surface of the water level towards the center of the pool or spa relative to the sides of the pool or spa due to no sag and an upward deflection (negative deflection) from horizontal of the leading edge) across the width of the pool or spa relative to the coping of the pool or spa and water surface of the pool or spa when the cover is in closed position. In this configuration, the leading edge is advantageously maintained above the surface of the water in the pool or spa when the cover is in an open position and also when the cover is traversing the length of the pool or spa during the opening or closing operation. Hence the leading edge of the instant disclosure may have an upward deflection (as opposed to a downward deflection of prior art leading edges), which results in a "frown" shape across the width. The "frown" shape of the leading edge during the pool cover opening and closing operation allows for the cover to easily traverse the length of the pool without striking the surface of the water. With prior art leading edges, the leading edge for a pool or spa cover is typically in the shape of a "smile" (defined as the leading edge being closer to the horizontal surface of the water level towards the center of the pool or spa relative to the sides of the pool or spa due to "sag" or downward deflection from horizontal of the leading edge) across the width of the pool or spa relative to the coping of the pool or spa and water surface of the pool or spa when the cover is in the open or closed position. This "smile" configuration of the leading edge (in the positive deflection direction) is undesirable because the leading edge may contact the surface of the water in the pool or spa when the cover is in an open or closed position and also when the cover is traversing the length of the pool or spa during the opening or closing operation, which impedes the movement of the pool cover.

The leading edges with joiner technology of the instant disclosure may also have a "frown" configuration or a no-load upward deflection (in the negative deflection direction) from horizontal ranging from 0 to 2.5 inches measured at the center (or half the axial length) of the leading edge for a range of tube outside diameters ranging from 1.0 to 3.0 inches and for axial lengths of the leading edge of up to 100 feet. In particular, the leading edges of the instant disclosure using two or more composite tubes interconnected with joiners, which are disclosed below in detail, may provide for an upward deflection (in the negative deflection direction) under no load ("frown" shape) from horizontal ranging from 0 to 0.250 inches per 10 feet of width of the pool, or a deflection ranging from 0 to 0.200 inches per 10 feet of width of the pool, or a deflection ranging from 0 to 0.175 inches per 10 feet of width of the pool, or a deflection ranging from 0 to 0.150 inches per 10 feet of width of the pool, or a deflection ranging from 0 to 0.125 inches per 10 feet of width of the pool, or a deflection ranging from 0 to 0.100 inches per 10 feet of width of the pool, or a deflection ranging from 0 to 0.075 inches per 10 feet of width of the pool, or a deflection ranging from 0 to 0.050 inches per 10 feet of width of the pool, or a deflection ranging from 0 to 0.025 inches per 10 feet of width of the pool, or a deflection ranging from 0 to 0.010 inches per 10 feet of width of the pool, or a deflection ranging from 0 to 0.005 inches per 10 feet of width of the pool.

The leading edge for a pool or spa cover of the instant disclosure may be in the form a single continuous piece (one fiber reinforced composite) that traverses the entire width of the pool or spa. In the case of a single continuous piece for the leading edge of the instant disclosure, there may be no deflection or downward deflection (in the positive direction to form a "smile") or even an upward deflection (in the negative direction to form a "frown") under no-load of the leading edge, although either no deflection or downward deflection are more prevalent for the single continuous piece embodiment.

In an alternative form of the instant disclosure, the leading edge may be formed from two or more fiber reinforced composites of the same dimensions, composite structure and properties that are axially aligned at their respective ends and coupled together with one or more joiners (referred to as "joiner" or "joiner technology" embodiment for composite based leading edge). In the case of the joiner form of the leading edge of the instant disclosure, there may be no deflection or downward deflection (in the positive direction to form a "smile"), or even upward deflection (in the negative direction to form a "frown") under no-load of the leading edge. In this form, the two or more fiber reinforced composites are preferably of an annular cross-sectional shape and are coupled together at their ends with one or more joiners.

The two or more fiber reinforced composites with joiner (s) embodiment may be particularly advantageous for incremental pool or spa widths of greater than or equal to 5 feet, or greater than or equal to 10 feet, or greater than or equal to 12 feet, or greater than or equal to 15 feet, or greater than or equal to 17 feet, or greater than or equal to 20 feet, or greater than or equal to 25 feet, or greater than or equal to 30 feet, or greater than or equal to 35 feet, or greater than or equal to 40 feet, or greater than or equal to 45 feet, or greater than or equal to 50 feet, or greater than or equal to 60 feet.

In one form of the joiner embodiment, a single joiner may be used at about the center or middle of the axial length of the leading edge to connect two composite based tubes of nearly equal axial lengths together to unexpectedly provide a negative or upward deflection ("frown" shape) in the overall shape of the leading edge. This results in a significantly lower overall deflection of the leading edge compared to a comparable leading edge not including the single joiner. In another form, two joiners may be used approximately equidistantly spaced between the overall axial length of the leading edge including three axially aligned fiber reinforced composites to further provide even less deflection of the leading edged relative to a comparable leading edge not including the two joiners. In yet another form, three joiners may be used approximately equidistantly spaced between the overall axial length of the leading edge including four axially aligned fiber reinforced composites to further provide even less deflection of the leading edged relative to a comparable leading edge not including the three joiners. In still yet another form, four joiners may be used approximately equidistantly spaced between the overall axial length of the leading edge including five axially aligned fiber reinforced composites to further provide even less deflection of the leading edged relative to a comparable leading edge not including the four joiners. In still yet another form, five joiners may be used approximately equidistantly spaced between the overall axial length of the leading edge including six axially aligned fiber reinforced composites to further provide even less deflection of the leading edged relative to a comparable leading edge not including the five joiners.

The inventive joiner technology embodiments described above permits for composite based leading edges to be used for pools and spas of up to 100 feet in width while still providing for near zero or minimal downward deflection or even upward deflection of the leading edge. For example, a 30 foot long leading edge may be made from two 15 foot long fiber reinforced composite tubes of the instant disclosure with a joiner (inner plug type or outer sleeve type) in the middle to connect the two 15 foot long composite tubes together. This unexpectedly results in a negative or upward deflection ("frown") in the overall leading edge. This upward deflection in the leading edge with the single joiner (once it cures and relaxes) yields two tubes (one of each side of the joiner) where the deflection occurs below the neutral axis and that the overall deflection would be about $1/16^{th}$ of what the entire composite tube deflection would be if a comparable single composite tube did not include the single joiner in the center or middle. Effectively, the center of each of the composite tubes on each side of the joiner deflect at the theoretical amount of what a 15 foot tube would deflect, which is $1/16$th that of a single 30 foot fiber reinforced composite tube without a joiner in the middle or center of the overall axial length of the leading edge.

An internal or inner plug type joiner or an external or outer sleeve type joiner or combinations thereof are particularly preferred to join the fiber reinforced composite based tubes and are described in more detail below. The segmented composite based leading edge including one or more joiners after it is fabricated will have an upward deflection or "frown" at the center slightly above the neutral axis as described above. The segmented composite based leading edge including one or more joiners may then be cured, preferably using a matrix that is post-cured at an elevated temperature, however room temperature curing may also suffice, which results in the relaxation of the segmented composite based leading edge including one or more joiners to unexpectedly result in a leading edge with near zero, or minimal downward deflection, or even an upward deflection from horizontal across widths ranging from 10 feet to 100 feet. The segmented composite based leading edge including one or more joiners disclosed herein allows for pool and spa widths of up to 100 feet in width that may still use an automated pool cover because of the lightweight and near zero, or minimal downward deflection of the leading edge compared to prior art leading edges, which cannot be effectively utilized on pool or spas of greater than 30 feet in width.

In one form, the two or more fiber reinforced polymer composites are annular shaped and are coupled together with one or more joiners, which are in the form of a solid or hollow cylinder. The length of the joiner may range from 5 to 12 inches, or 6 to 11 inches, or 7 to 10 inches, or 8 to 9 inches. In one form, the joiner may be positioned inside the two or more annular shaped fiber reinforced polymer composites axially aligned at their ends (inner "plug type" joiner). In this form, the inner plug type joiner may have an outside diameter that is from 1 mil to 10 mil, or 2 to 9 mil, or 3 to 8 mil, or 4 to 7 mil, or 5 to 6 mil less than the inside diameter of the annular shaped fiber reinforced polymer composites being joined. In another form, the joiner may be positioned as a sleeve over the two or more annular shaped fiber reinforced polymer composites axially aligned at their ends (outer "sleeve type" joiner). In this form, the outer sleeve type joiner may have an inside diameter that is from 1 mil to 10 mil, or 2 to 9 mil, or 3 to 8 mil, or 4 to 7 mil, or 5 to 6 mil greater than the outside diameter of the annular shaped fiber reinforced polymer composites being joined. For pool or spa widths of greater than or equal to 15 feet, the use of one or more joiners may be used to further decrease the deflection (both under no-load and under water load) of the leading edges of the present disclosure.

The inner plug type joiner and outer sleeve type joiner may be fabricated from aluminum or a thermoplastic polymer or a thermoset polymer. Non-limiting exemplary thermoplastic polymers for the joiner include polyester, polyamide, acrylonitrile butadiene styrene, polylactic acid, polycarbonate, polyether ether ketone, polyethylene, polypropylene, and polyvinyl chloride. Non-limiting exemplary thermoset polymers for the joiner include polyester, epoxy, phenolic, vinyl ester, polyurethane, silicone, polyamide and polyamide-imide. Furthermore, the inner plug type joiner and outer sleeve type joiner may be fabricated from carbon, glass, aramid, and polyester fiber reinforced composites using the aforementioned thermoplastic polymers and thermoset polymers. Alternatively, the inner plug type joiner and outer sleeve type joiner may be fabricated fully or in a hybrid form from aluminum, titanium, stainless steel, copper, and alloys of these metals. Inner plug type joiners and outer sleeve type joiners fabricated from a thermoplastic polymer or a thermoset polymer are preferred relative to metallic type joiners disclosed above because of not requiring "bonding" with the pool cover.

The fiber reinforced polymer composite leading edge for a pool or spa cover of the instant disclosure may be fabricated by a variety of manufacturing processes, including, but not limited to, conventional 2-D layup, roll forming, pultrusion, single filament (or tape) winding, vacuum assisted resin transfer (VARTM), single and double bagging, injection molding and various forms of resin transfer molding (RTM).

Leading Edge Kit of the Instant Disclosure

In another form, the inventive composite based leading edge may be provided to the pool and/or spa cover system installer in the form of a kit of components that may be assembled at the site of the pool or spa to form a segmented leading edge using the joiner technology described above. This kit form for the composite based leading edge provides for ease of storage and transport of the composite based leading edge, and in particular when its axial length exceeds 15 feet. In particular, air shipping and truck transport become challenging for leading edges that are longer than 15 feet because of airplane cargo length limitations and truck cargo bed length limitations. Hence, the kit form of the composite based leading is particularly advantageous for pool or spa cover systems that are greater than or equal to 15 feet in width and allow for effective leading edges for wide (20 to 100 feet width) pools and spas.

The pool and/or spa cover leading edge kit includes annular shaped fiber reinforced polymer composite segments that have an axial length of from 3 feet to 20 feet, or from 4 feet to 15 feet, or from 5 feet to 10 feet, or from 6 to 8 feet. The number of annular shaped fiber reinforced polymer composite segments in the kit may range from 2 to 12, or 3 to 10, or 4 to 9, or 5 to 8, or 6 to 7. The pool and/or spa cover leading edge kit also includes at least one joiner, or two joiners, or three joiners, or four joiners, or five joiners, or six joiners, or 7 joiners, or 8 joiners, or 9 joiners, or 10 joiners, or 11 joiners for coupling together the annular shaped fiber reinforced polymer composite segments at their abutting axial ends to form a segmented leading edge. The number of joiners in the kit will generally be one less than the number of annular shaped fiber reinforced polymer composite segments in the kit. These annular shaped fiber reinforced polymer composite segments may be axially aligned at the pool or spa site and interconnected or coupled at their abutting ends with the one or more joiners in the kit to match the width of the pool or spa cover. When a pair of annular shaped fiber reinforced polymer composite segments are axially aligned at their axial ends, the end of the two segments should be in contact with one another (abutting axial ends of two adjacent segments), and then a joiner may be used to hold or connect them together.

In one form, a kit with two annular shaped fiber reinforced polymer composite segments are axially aligned at their abutting ends and coupled with a plug type joiner or a sleeve type joiner from the kit. With a plug-type joiner, the joiner is press fit into the inside diameter of each composite segment at their abutting axial ends to hold or join the two composite segments together. With a sleeve-type joiner, the joiner is slid over the outside diameter of each composite segment at their abutting axial ends to hold or join the two composite segments together. Generally, the joiner should be positioned about half-way or mid-way into (plug-type) or over (sleeve-type) each of the abutting composite segments for joining. So for example, if a joiner with an axial length of 6 inches is used, about 3 inches should be in or over one of the composite segments and about 3 inches should be in (plug-type) or over (sleeve-type) the other adjacent abutting composite segment.

In another form, a kit with three annular shaped fiber reinforced polymer composite segments are axially aligned at their ends and coupled with two joiners (plug type, sleeve type or combination thereof) from the kit. In yet another form, a kit with four annular shaped fiber reinforced polymer composite segments are axially aligned at their ends and coupled with three joiners (plug type, sleeve type or combination thereof) from the kit. In still yet another form, a kit with five annular shaped fiber reinforced polymer composite segments are axially aligned at their ends and coupled with four joiners (plug type, sleeve type or combination thereof) from the kit. In further still yet another form, a kit with six annular shaped fiber reinforced polymer composite segments are axially aligned at their ends and coupled with five joiners (plug type, sleeve type or combination thereof) from the kit.

The annular cross-sectional shaped fiber reinforced polymer composite segments may be also easily cut at the pool cover installation site with an appropriate cutting tool or device so as to match or fit the overall width of the pool or spa cover. This cutting step may advantageously occur before the annular shaped fiber reinforced polymer composite segments are coupled together with one or more joiners at the pool or spa cover installation site. A rotary table saw or a hand saw are non-limiting examples of cutting tools or devices that may be used to cut annular shaped fiber reinforced polymer composite segments at the pool or spa cover installation site to form the appropriate width of the segmented composite based leading edge.

The kit may also optionally include at least two luff groove segments that are capable of being attached to the outside surface of the at least two annular shaped fiber reinforced polymer composite segments along the axial direction of the composite segments at the installation site. The number of luff groove segments in the kit may be generally equal to the number of the annular shaped fiber reinforced polymer composite segments in the kit and may also be of the same axial length. Hence, the number of luff groove segments in the kit may range from 2 to 12, or 3 to 10, or 4 to 9, or 5 to 8, or 6 to 7, and the axial length of the luff groove segments may range from 3 feet to 20 feet, or from 4 feet to 15 feet, or from 5 to 10 feet, or from 6 to 8 feet.

In another form, the luff groove may be integral to the outside surface of the annular shaped fiber reinforced polymer composite segments within the kit (oriented along the axial direction of the composite segments), which eliminates the need for separate luff groove segments within the kit. When the kit includes separate luff groove segments, it may also include a means for fastening the luff groove segments to the annular shaped fiber reinforced polymer composite segments at the pool or spa cover installation site. Non-limiting means for fastening the luff groove segments to the composite segments include adhesive, mechanical fasteners, rivets, screws or high strength bonding tape.

Pool and/or Spa Cover System of the Instant Disclosure

Also provided herein is a pool and/or spa cover system that incorporates the leading edge assembled from a leading edge kit of the instant disclosure. In particular, provided is a pool and/or spa cover system for a pool and/or spa including: 1) a pool and/or spa cover, 2) a leading edge assembled from a leading edge kit of the instant disclosure coupled to the front end of the pool and/or spa cover, 3) a roller drum coupled to the back end of the pool and/or spa cover for storing, winding and unwinding the pool and/or spa cover, 4) a drive assembly including an electric or hydraulic motor coupled to the roller drum for rotating the roller drum in the forward and reverse direction, 5) a parallel track channel assembly coupled to the side walls of the pool and/or spa between the surface of the water and the coping for guiding the pool and/or spa cover across the length of the pool and/or spa, 6) a pump for removing water from the top surface of the pool cover when in the closed position and 7) a control assembly for the drive assembly for providing a user interface for the opening or closing of the pool and/or spa cover.

The leading edge assembled from a leading edge kit for the pool and/or spa cover system aforementioned is fabricated from a fiber reinforced polymer composite having at least one of continuous fibers or discontinuous fibers oriented at least partially in the axial direction with the fibers encapsulated by a thermoset or thermoplastic resin matrix. This results in a significant reduction in the deflection of the leading edge compared to prior art leading edges fabricated from aluminum. In particular, the leading edges of the aforementioned pool and/or spa cover system provide for a deflection ranging from 0 to 0.10 inches per 10 feet of width of the pool or spa.

The pool or spa cover for the pool and/or spa cover system may be made of materials typically used for such covers. One advantageous type material for the pool or spa cover is polyvinyl chloride. The roller drum for the pool and/or spa cover system may be made of, for example, anodized aluminum or stainless steel. When an electric motor is coupled to the roller drum for rotating the roller drum in the forward and reverse direction, a constant speed alternating current type is advantageous.

The parallel track channel assembly used for guiding the pool or spa cover and leading edge along the length of the pool for either covering or uncovering the pool or spa includes 1) a channel with a linear track enclosed within the channel, 2) a shim at the bottom of the channel, 3) a pulley at one end of the track channel assembly, 4) a guide at the other end of the track channel assembly and 5) a rope or cable for sliding the leading edge of the pool and/or spa cover along the linear track of the channel. The parallel track channel assembly may be mounted to or within the side walls of the pool or spa and hence may be a wall mounted track assembly, an encapsulated track assembly or an in-wall track assembly.

Method of Reducing the Deflection of a Leading Edge for a Pool and/or Spa Cover of the Instant Disclosure Also provided herein is a method of reducing the deflection of a leading edge for a pool and/or spa cover including the steps of: 1) providing a pool and/or spa cover with a leading edge assembled from a leading edge kit coupled to the front end of the pool and/or spa cover, wherein the leading edge comprises a fiber reinforced polymer composite with an axial length from 5 feet to 50 feet to correspond to the width of the pool or spa, wherein the composite includes at least one of continuous fibers or discontinuous fibers oriented at least partially in the axial direction, and wherein the at least one of continuous fibers or discontinuous fibers are encapsulated by a thermoset or thermoplastic resin matrix, and 2) upon opening or closing the pool and/or spa cover, the deflection of the leading edge coupled to the pool and/or spa cover across the width of the pool and/or spa ranges from 0 to less than or equal to 0.10 inches per 10 feet of width of the pool and/or spa and a linear weight per foot of from 4 to 14 ounces per foot of axial length of the leading edge.

Embodiments Disclosed Herein

Referring to FIG. 1, an annular shaped leading edge 10 in the form of a fiber reinforced polymer composite is shown. FIG. 1a. is a cross-sectional view of the annular shaped leading edge 10 depicting an inner wall 2 and an outer wall 4 which forms the inside diameter and outside diameter of the annular shape. FIG. 1b. is a perspective view of the full axial length of the annular shaped leading edge 10 depicting a first end 6 and a second end 8. FIG. 1*c*. is an enlarged perspective view of the first end 6 of the annular shaped leading edge 10 of FIG. 1*b*.

Figure 2:
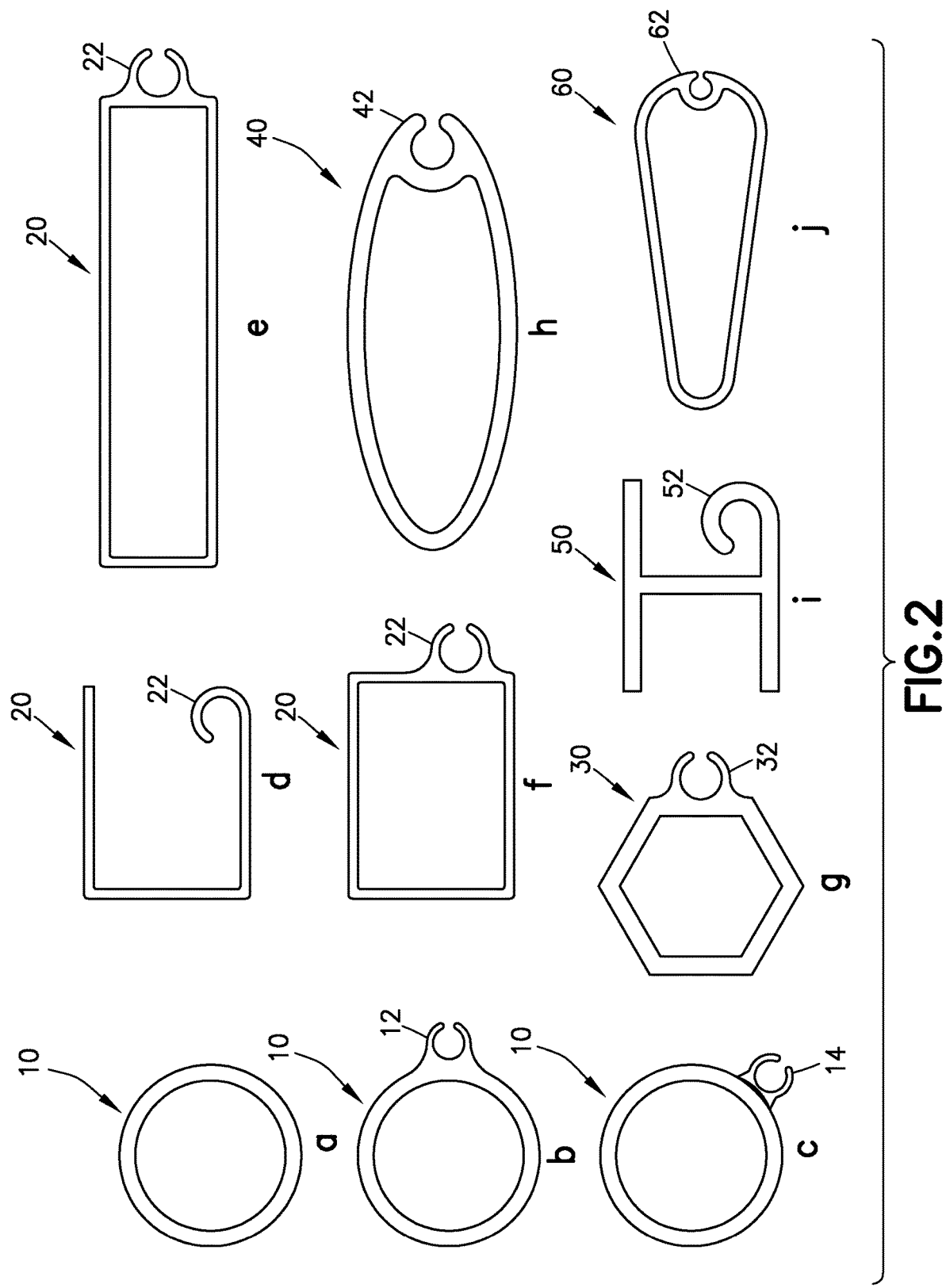
FIG. 2a. to j. depicts cross-sectional views of various shapes of the leading edge of the instant disclosure.

Referring to FIG. 2, depicted are cross-sectional views of various shapes of the fiber reinforced polymer composite leading edge of the instant disclosure. FIG. 2*a*. shows an annular shaped leading edge 10 in the form of a fiber reinforced polymer composite without a luff groove, FIG. 2*b*. shows an annular shaped leading edge 10 in the form of a fiber reinforced polymer composite with an integral luff groove 12, and FIG. 2*c*. shows an annular shaped leading edge 10 in the form of a fiber reinforced polymer composite with a separate luff groove 14 attached to the cylinder. FIGS. 2*d*., 2*e*., and 2*f*. show square and rectangular shaped leading edges 20 in the form of a fiber reinforced polymer composite with integral luff grooves 22. FIG. 2*g*. shows a diamond shaped leading edge 30 in the form of a fiber reinforced polymer composite with an integral luff groove 32. FIG. 2*h*. shows an oval shaped leading edge 40 in the form of a fiber reinforced polymer composite with an integral luff groove 42. FIG. 2*i*. shows an "H" shaped leading edge 50 in the form of a fiber reinforced polymer composite with an integral luff groove 52. FIG. 2*j*. shows a tear drop shaped leading edge 60 in the form of a fiber reinforced polymer composite with an integral luff groove 62.

Figure 3:
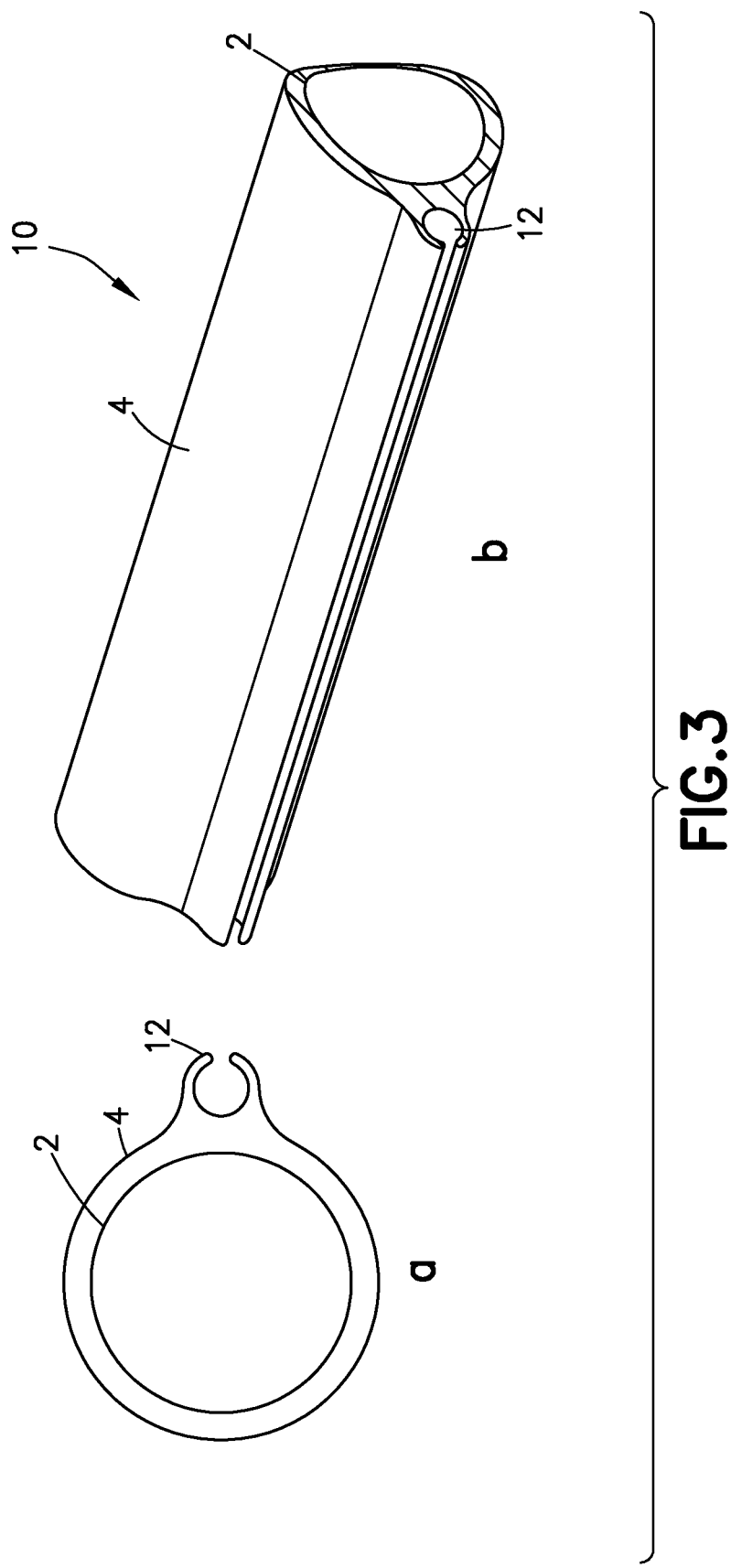
FIGS. 3a. and b. depicts a cross-sectional and a perspective view of an annular shape leading edge of the instant disclosure with a luff groove (for example, a Keder™ track type groove) integral to the leading edge.

Referring to FIG. 3, depicted are a cross-sectional view (3*a*.) and a perspective view (3*b*.) of an annular shape leading edge 10 of the instant disclosure with a luff groove 12 integral to the leading edge 10. FIGS. 3*a*. and 3*b*. show the annular shaped leading edge 10 in the form of a fiber reinforced polymer composite with an inner wall 2, an outer wall 4 and an integral luff groove 12.

Referring to FIG. 4, depicted are a cross-sectional view (4*a*.) and a perspective view (4*b*.) of an annular shape leading edge 10 of the instant disclosure with a luff groove 14 as a separate piece attached to the leading edge 10. FIGS. 4*a*. and 4*b*. show the annular shaped leading edge 10 in the form of a fiber reinforced polymer composite with an inner wall 2, an outer wall 4 and a separately attached luff groove 14.

Referring to FIG. 5, depicted is a cross-sectional view of a luff groove 14 as a separate piece for attachment to a leading edge in the form of a fiber reinforced polymer composite of the instant disclosure. The luff groove 14 includes an inner wall 16, an outer wall 18 to form a circular shape for attachment of a pool cover awning rail or rod and a bottom wall 19 for attachment to a leading edge.

Figure 6:
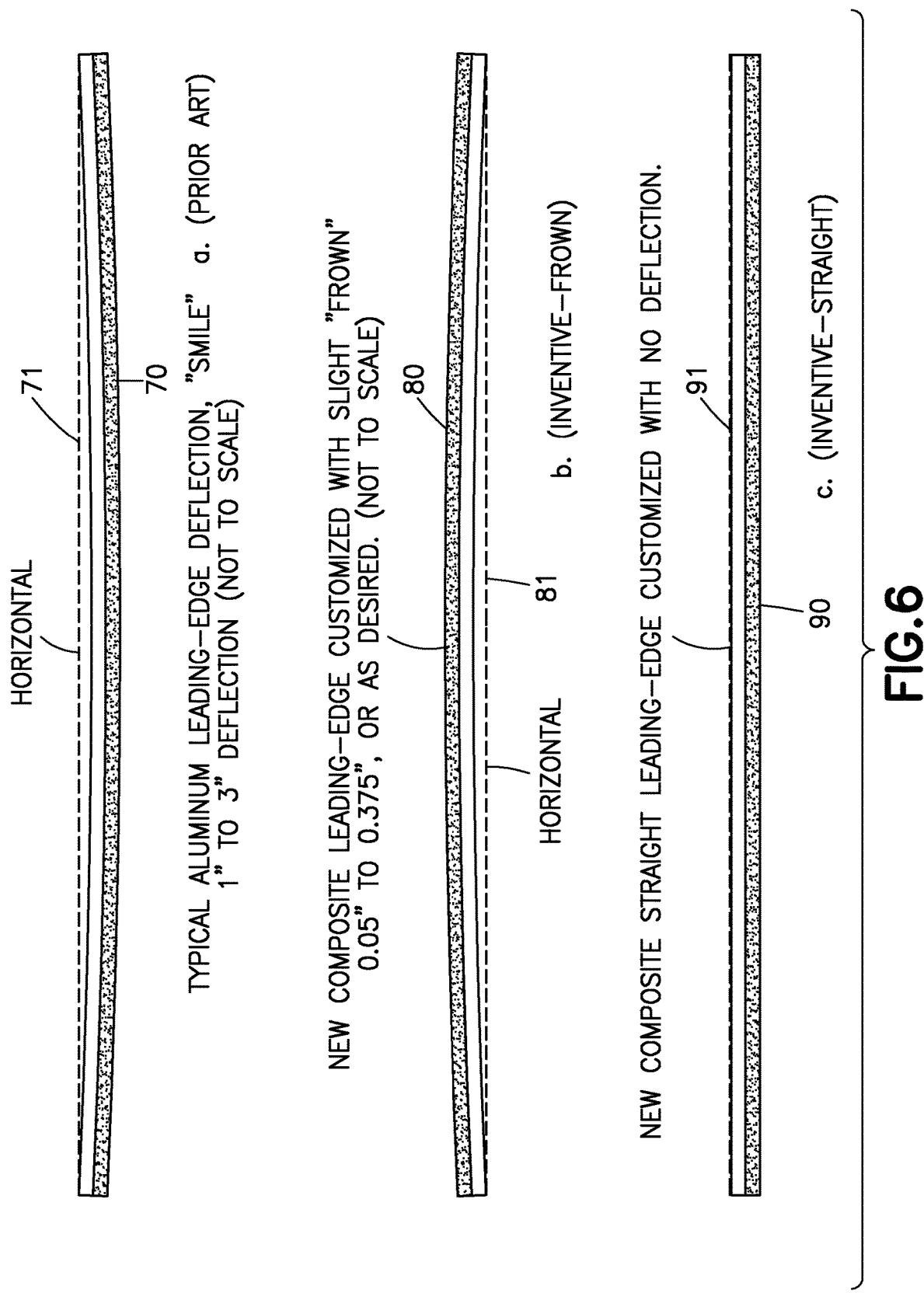
FIG. 6 a., b. and c. depict the deflection relative to horizontal of the prior art aluminum leading edge (6a.) and two embodiments (6b., 6c.) of the leading edge in the form of a fiber reinforced polymer composite of the instant disclosure

Referring to FIG. 6, depicted are the deflection across the axial length of the leading edge relative to horizontal of the prior art aluminum leading edge (6*a*.) and two embodiments (6*b*., 6*c*.) of the leading edge in the form of a fiber reinforced polymer composite of the instant disclosure. For a typical prior art aluminum leading edge of FIG. 6*a*., the aluminum tube 70 deflects in the shape of a "smile" (downward deflection) from horizontal (71—dashed line) in the range of 1 inch to 3 inches from horizontal (positive direction as defined for the purposes of this disclosure). This range of 1 to 3 inches is the downward deflection measured at the center (or half the axial length) of the leading edge for a range of tube outside diameters ranging from 1.5 to 2.0 inches (1.5, 1.75 and 2.03 inches) and for axial lengths of the leading edge up to 30 feet. This downward deflection limits the pool or spa width that the prior art aluminum leading edge 70 may be used for due to excessive sag and deflection at the midway point of the axial length of the leading edge. In contrast, for one inventive embodiment of the leading edge 80 in the form of a fiber reinforced polymer composite shown in FIG. 6*b*., the leading edge may be designed to deflect in the shape of a slight "frown" (upward deflection) from horizontal (81—dashed line) (negative direction as defined for the purposes of this disclosure), which allows for wider pool or spa widths. In this case, the upward deflection from horizontal may be in the range of 0.05 to 0.375 inches measured at the center (or half the axial length) of the leading edge for a range of tube outside diameters ranging from 1.5 to 2.0 inches (1.5, 1.75 and 2.03 inches) and for axial lengths of the leading edge up to 30 feet. In another inventive embodiment of the leading edge 90 in the form of a fiber reinforced polymer composite shown in FIG. 6*c*., the leading edge may be designed with essentially no deflection (about 0 inches) from horizontal (91—dashed line) measured at the center (or half the axial length) of the leading edge for a range of tube outside diameters ranging from 1.5 to 2.0 inches (1.5, 1.75 and 2.03 inches) and for axial lengths of the leading edge up to 30 feet, which again allows for wider pool or spa widths.

Figure 7:
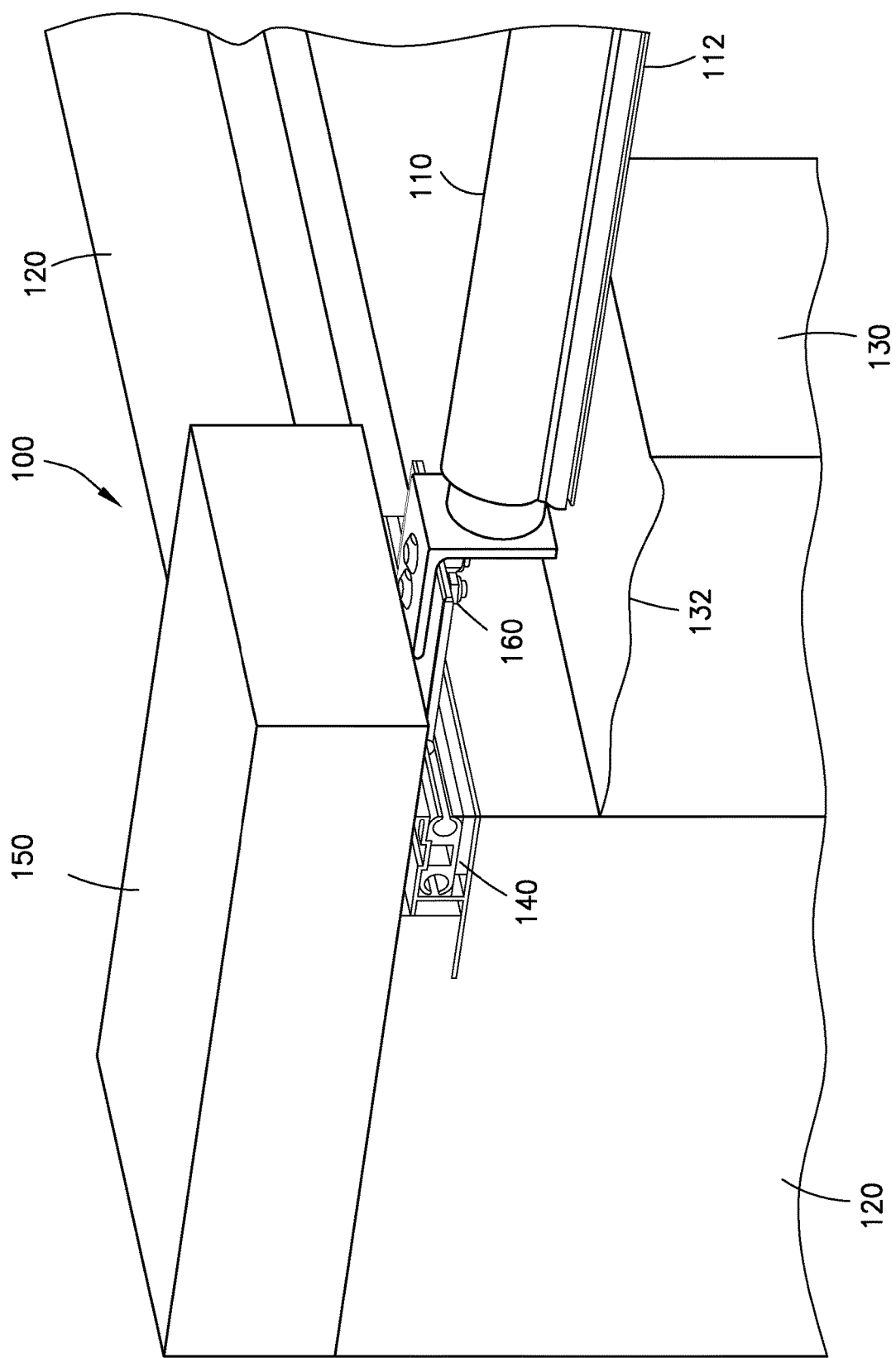
FIG. 7 depicts a perspective view of a leading edge in the form of a fiber reinforced polymer composite of the instant disclosure mounted to a pool or spa structure or side wall of a pool or spa.

Referring to FIG. 7, a perspective view of a leading edge in the form of a fiber reinforced polymer composite 110 of the instant disclosure mounted to a pool or spa structure or side wall 120 of a pool or spa 100 is shown. The water 130 in the pool or spa 100 is below the leading edge 110 as shown by the water surface 132. The leading edge 110 includes a luff groove 112 for securing the pool or spa cover (not shown) to the leading edge 110. A linear slider assembly 140 is attached to the side wall 120 of the pool or spa 100. The linear slider assembly 140 allows the pool or spa cover with the leading edge 110 to traverse the length of the pool or spa 100 in order to cover and uncover the pool or spa 100. The linear slider assembly 140 is mounted underneath the pool or spa patio stone 150, which is also referred to as the coping or coping stone 150. Adaptive hardware 160 is used to mount or interconnect the leading edge 110 to the linear slide assembly 140 (also referred to as parallel track channel assembly) underneath the coping 150.

Figure 8:
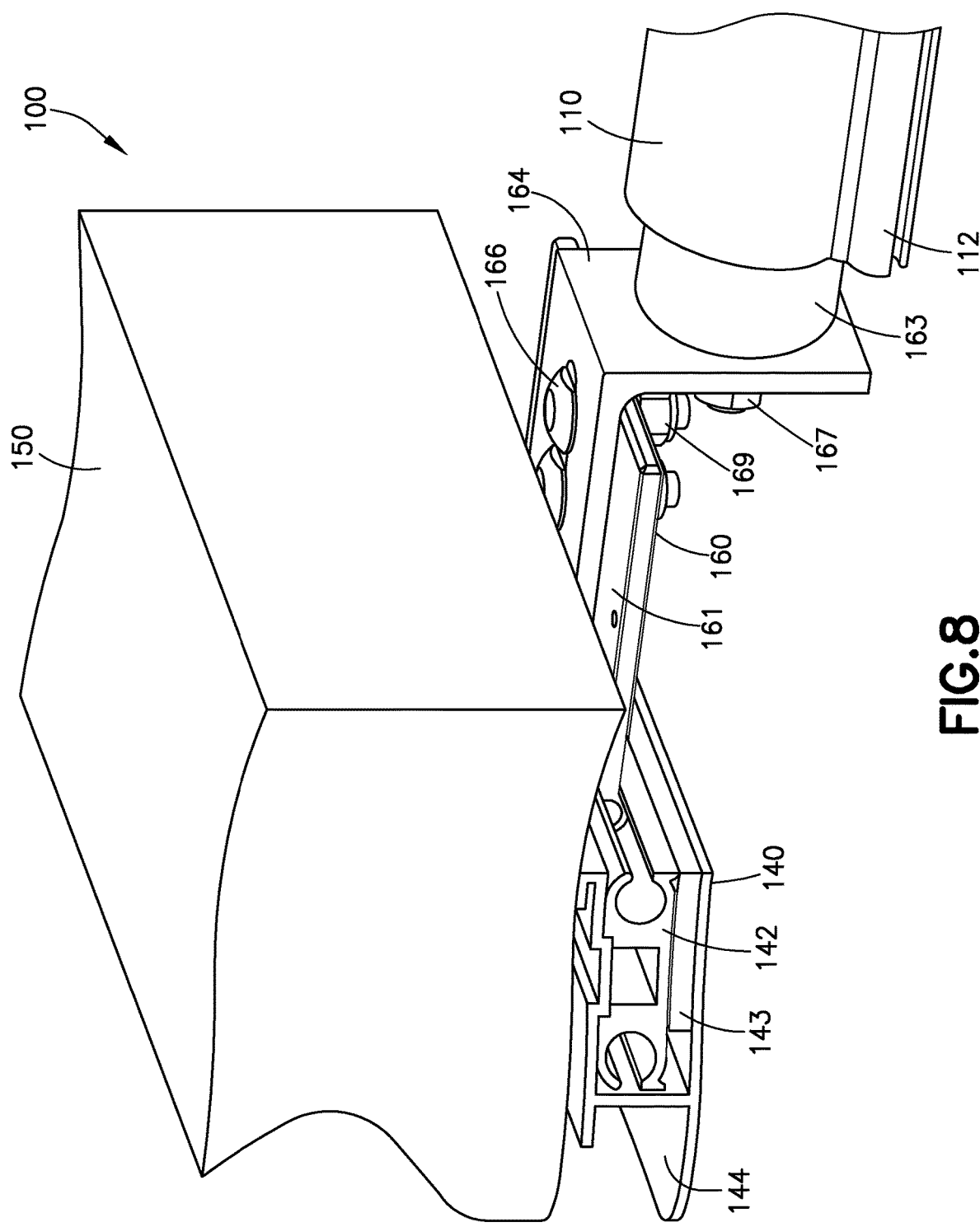
FIG. 8 depicts a perspective view of one side of a linear slider assembly with adaptive hardware mounted under the coping for one side wall of a pool or spa for use with the leading edge of the instant disclosure.

Referring to FIG. 8, a perspective view of a leading edge in the form of a fiber reinforced polymer composite 110 of the instant disclosure including the linear slide assembly 140 (also referred to as parallel track channel assembly) and the adaptive hardware 160 for mounting leading edge 110 and attached pool cover (not shown) under the coping 150 of a pool or spa 100 is shown. The leading edge 110 includes a luff groove 112 for securing the pool or spa cover (not shown) to the leading edge 110. The linear slider assembly 140, which gets mounted to the side wall of the pool or spa 100 under the coping 150, includes a rail or track 142, a shim 143, and a channel 144. The adaptive hardware 160 used to connect the leading edge 110 to the linear slider assembly 140, includes a dowel or insert slide (typically made of ABS plastic) 163, which locks into one end of the inside diameter of the leading edge 110. A lateral/vertical adjustment bracket 164 secures a rotational alignment pin (not shown) using pin locknuts 167. The rotational alignment pin is locked into the inside diameter of the dowel 163 at the other end. A slide 161 is positioned in the rail 142 of the linear slider assembly 140 and is attached to the lateral/vertical adjustment bracket 164 using bracket carriage bolts 166 and bracket locknuts 169. The leading edge 110 connected to the adaptive hardware 160 allows for the leading edge to slide along the rail or track 142 of the linear slider assembly 140. The linear slide assembly 140 (also referred to as parallel track channel assembly) is mounted under the coping 150 of each side wall of the pool or spa 100 and is the length of the side wall of the pool or spa 100, such that the pool or spa cover (not shown) can traverse the entire opening of the pool or spa 100.

Figure 9:
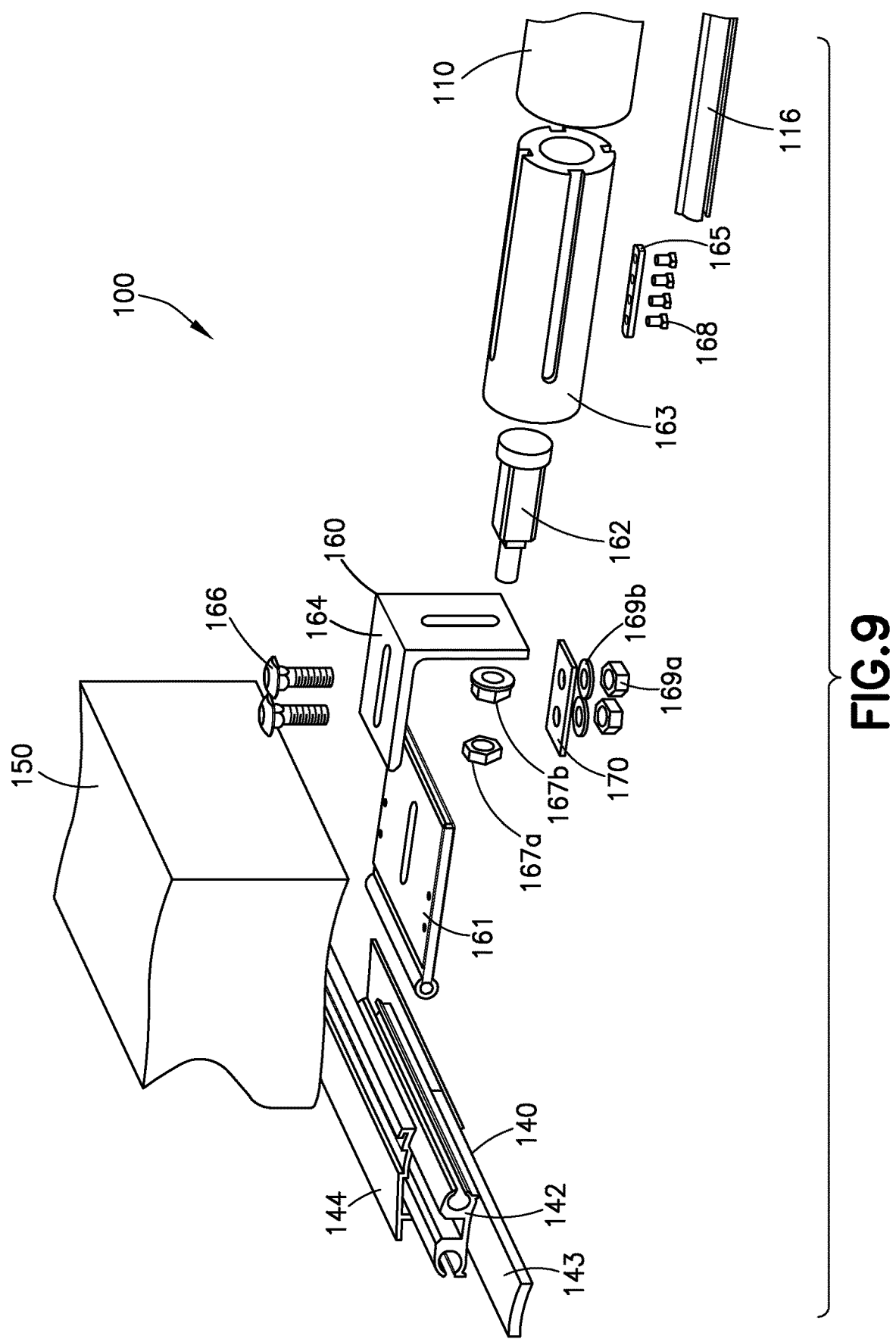
FIG. 9 is an assembly view of FIG. 8 for the leading edge of the instant disclosure with adaptive hardware and a linear slider assembly mounted under the coping for one side wall of a pool or spa.

Referring to FIG. 9, depicted is an assembly view of FIG. 8 for the leading edge 110 of the instant disclosure with adaptive hardware 160 and a linear slider assembly 140 mounted under the coping 150 for one side wall of a pool or spa 100. The leading edge 110 in the form of a fiber reinforced polymer composite of the instant disclosure is connected at each end to an insert slide or dowel 163, which includes rotational alignment keys 165 with key bolts 168 around the outer surface of the dowel 163 for locking the dowel 163 to the inside diameter of the leading edge 110. A rotational alignment pin 162 is secured to the other end of the dowel 163 and prevents the dowel 163 from rotating. The rotational alignment pin 162 is secured to a lateral/vertical adjustment bracket 164 using pin backup locknuts 167a. and pin locknuts 167b. A slide 161 is connected to the lateral underside of the lateral/vertical adjustment bracket 164 using bracket carriage bolts 166, washer plates 170, spring washers 169b. and bracket locknuts 169a. The slide 161 is positioned at the other end into the rail or track 142 of the linear slider assembly 140. The linear slider assembly 140, which gets mounted to the side wall of the pool or spa 100 under the coping 150, also includes a shim 143, and a channel 144. The awning rail 116 of the pool or spa cover (not shown) gets slid into the luff groove (not shown) of the leading edge 110 for securing the pool or spa cover to the leading edge 110, adaptive hardware 160 and linear slider assembly 140, such that the pool or spa cover can traverse the entire opening of the pool or spa 100 with no deflection or minimal deflection.

Figure 10:
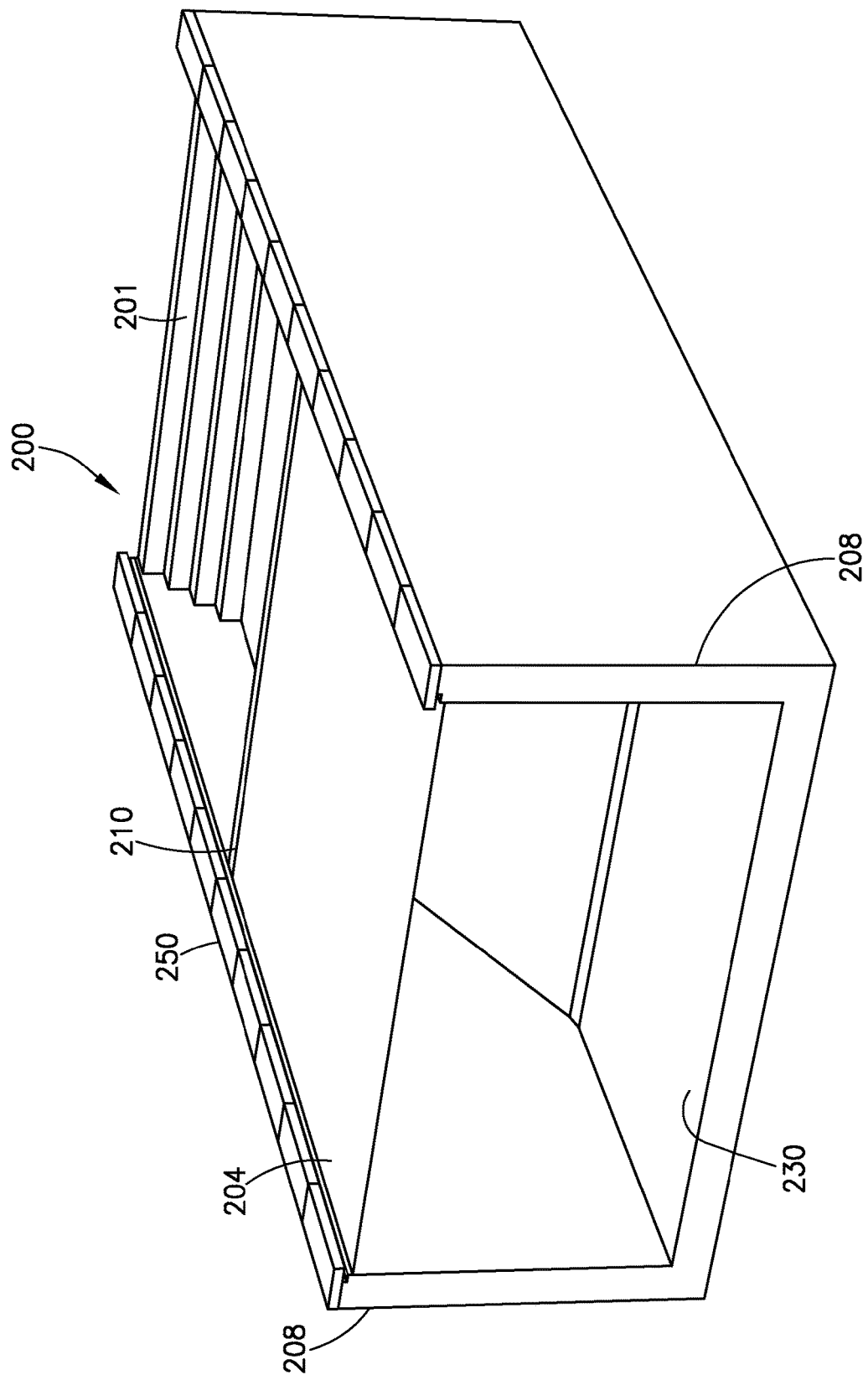
FIG. 10 is a perspective view of a pool with a pool cover in the partially closed position including a leading edge in the form of a fiber reinforced polymer composite of the instant disclosure.
Figure 11:
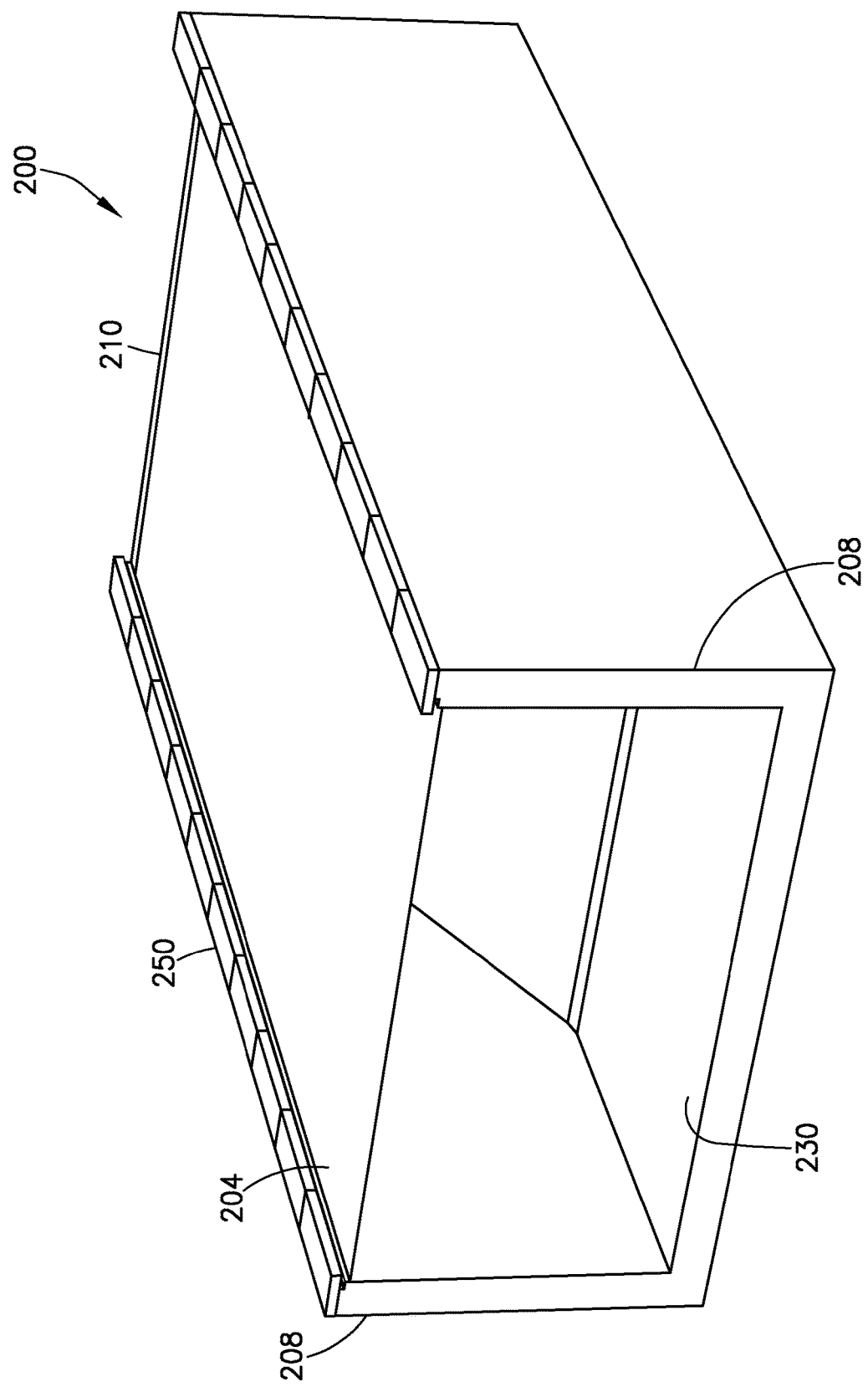
FIG. 11 is a perspective view of a pool with a pool cover in the fully closed position including a leading edge in the form of a fiber reinforced polymer composite of the instant disclosure.

Referring to FIG. 10, depicted is a pool 200 with a pool cover 204 in the partially closed position including a leading edge 210 in the form of a fiber reinforced polymer composite of the instant disclosure. The pool 200 includes steps 201 at the far end for accessing the water 230. Referring to FIG. 11, depicted is a pool 200 with a pool cover 204 in the fully closed position including a leading edge 210 in the form of a fiber reinforced polymer composite of the instant disclosure. A linear slide assembly (not shown) (also referred to as parallel track channel assembly) mounted under the coping (not shown) for the two side walls 208 of the pool is used to guide the pool cover 204 and the leading edge 210 along the length of the pool 200. A roller drum (not shown) is coupled to the one end (end opposite the leading edge) of the pool cover 204 for storing, winding and unwinding the pool cover 204. A drive assembly (not shown) including an electric or hydraulic motor coupled to the roller drum is used for rotating the roller drum in the forward and reverse direction to unwind and rewind the pool cover 204. An optional pump (not shown) is used for removing water 230 from the top surface of the pool cover 204 when the pool cover 204 is in the partially closed position of FIG. 10 or the fully closed position of FIG. 11. A control assembly (not shown) is used for the drive assembly for providing a user interface for the opening or closing of the pool cover 204.

Figure 12:
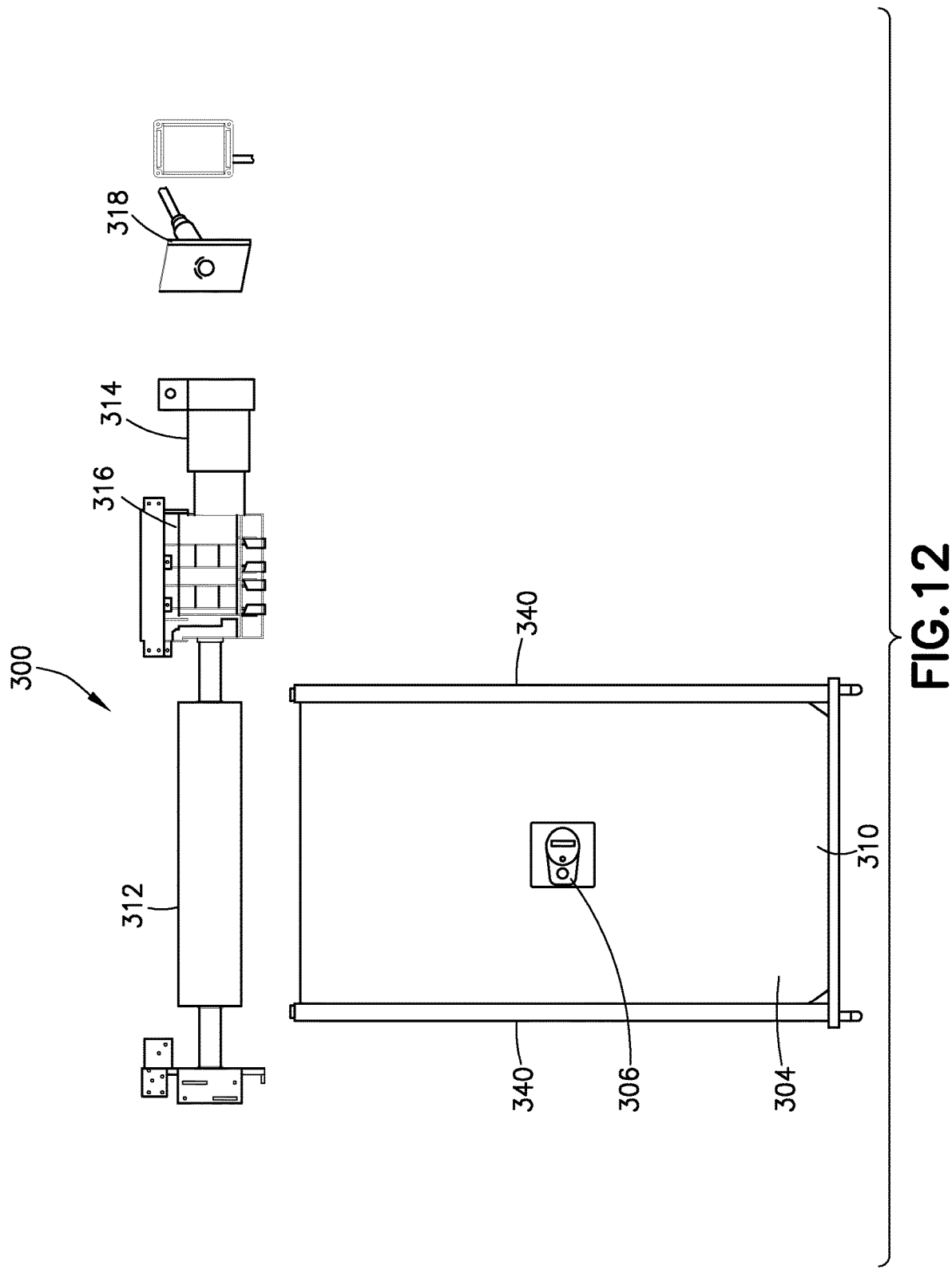
FIG. 12 is a top view of a pool with a pool cover system in the fully closed position including a leading edge in the form of a fiber reinforced polymer composite of the instant disclosure.

Referring to FIG. 12, depicted is a top view of an automated pool cover system 300 in the fully closed position including a leading edge 310 in the form of a fiber reinforced polymer composite of the instant disclosure. The pool cover system 300 includes a roller drum or tube 312 for storing the pool cover 304 when it is in the open position (not shown). The roller drum or tube 312 is coupled to a drive assembly including a waterproof motor 314 with a slip clutch 316. The waterproof motor 314 provides the power to turn the roller drum or tube 312 in either the forward or reverse direction in order to close or open the pool cover 304. A control assembly 318 for the motor 314 provides a user interface for the opening or closing of the pool cover 304. The pool cover 304 is guided along the side walls of the pool by a linear slide assembly 340 (also referred to as parallel track channel assembly) mounted under the coping for the two side walls of the pool 300. A pump 306 positioned on top of the pool cover 304 is used for removing water from the top surface of the pool cover 304 when the pool cover 304 is in the closed position as shown in FIG. 12.

Figure 13:
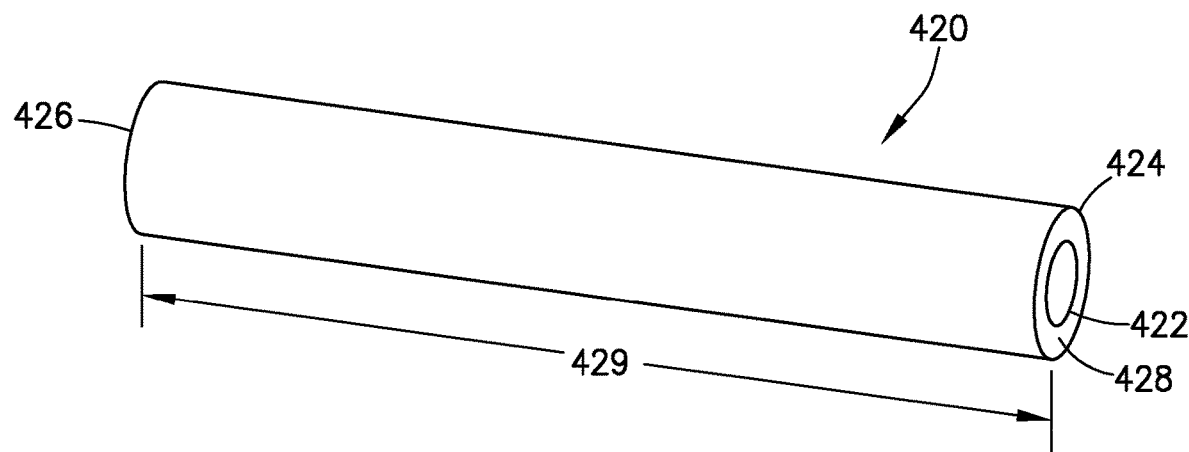
FIG. 13 is perspective view of an inner plug type joiner of the instant disclosure for coupling or joining together two axially aligned annular shaped leading edges in the form of a fiber reinforced polymer composite of the instant disclosure.

Referring to FIG. 13, depicted is perspective view of an inner hollow-cylinder plug type joiner 420 for coupling or joining together two axially aligned annular shaped leading edges in the form of a fiber reinforced polymer composite (not shown) of the instant disclosure. The annular shaped inner plug type joiner 420 is cylindrical and includes an inner wall 422, an outer wall 424, a first end 426, a second end 428 and an overall length "L" 429. The inner hollow-cylinder plug type joiner 420 of FIG. 13 may alternatively be in the form of an inner solid-cylinder plug type joiner.

Figure 14:
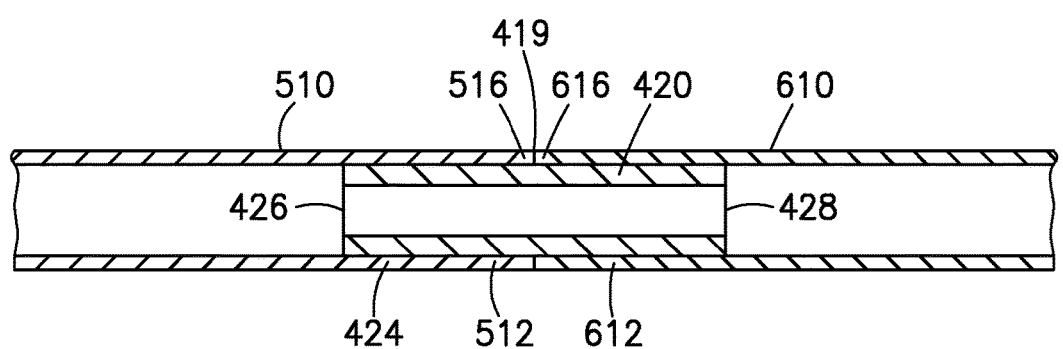
FIG. 14 is a frontal cross-sectional (cut-away) view of the inner plug type joiner of FIG. 13 coupling or joining together two axially aligned annular shaped leading edges in the form of a fiber reinforced polymer composite of the instant disclosure.
Figure 15:
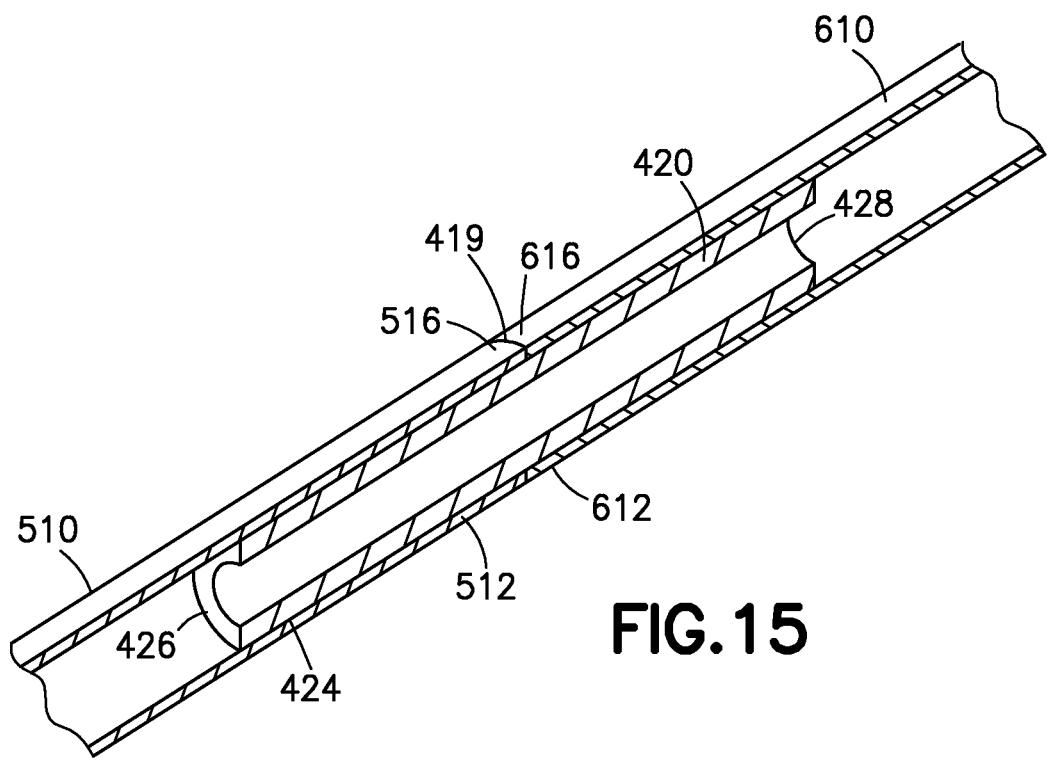
FIG. 15 is a perspective cross-sectional (cut-away) view of the inner plug type joiner of FIG. 13 coupling or joining together two axially aligned annular shaped leading edges in the form of a fiber reinforced polymer composite of the instant disclosure.

Referring to FIGS. 14 and 15, depicted are a frontal cross-sectional (cut-away) view and a perspective cross-sectional (cut-away) view respectively of the inner hollow-cylinder plug type joiner 420 of FIG. 13 coupling or joining together two axially aligned annular shaped leading edges in the form of a fiber reinforced polymer composite 510, 610 of the instant disclosure. The two axially aligned annular shaped leading edges 510, 610 are abutting against one another at their respective ends 516, 616 at point "P" 419, and the inner hollow cylinder plug type joiner 420 connects, couples or joins the two leading edges 510, 610 together. The inner hollow-cylinder plug type joiner 420 has an outside diameter 424 that is slightly less than the inside diameters 512, 612 of the two leading edges 510, 610, such that the joiner 420 can be slid into the inside of the respective ends 516, 616 of the two leading edges 510, 610 and couple them together. The inner hollow-cylinder plug type joiner 420 is also positioned about equidistant within the two leading edges 510, 610, such that about one-half of the length "L" 429 of the joiner 420 is within one leading edge 510 and about one-half of the length "L" 429 of the joiner 420 is within the other leading edge 610.

Figure 16:
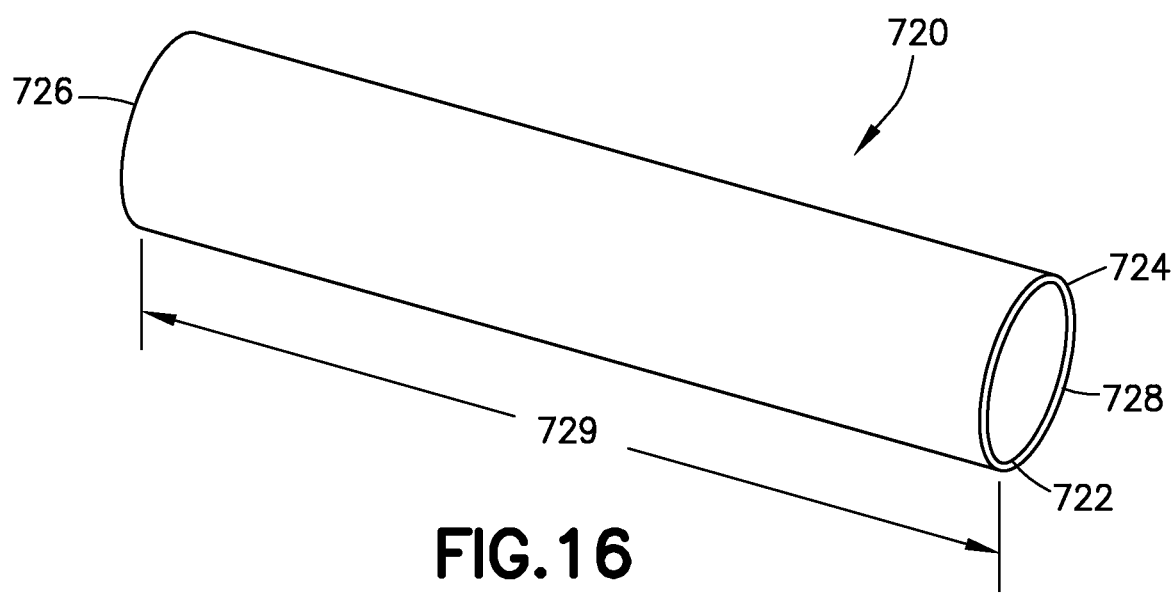
FIG. 16 is perspective view of an outer sleeve type joiner of the instant disclosure for coupling or joining together two axially aligned annular shaped leading edges in the form of a fiber reinforced polymer composite of the instant disclosure.

Referring to FIG. 16, depicted is perspective view of an outer hollow-cylinder sleeve type joiner 720 for coupling or joining together two axially aligned annular shaped leading edges in the form of a fiber reinforced polymer composite (not shown) of the instant disclosure. The annular shaped outer sleeve type joiner 720 is cylindrical and includes an inner wall 722, an outer wall 724, a first end 726, a second end 728 and an overall length "L" 729.

Figure 17:
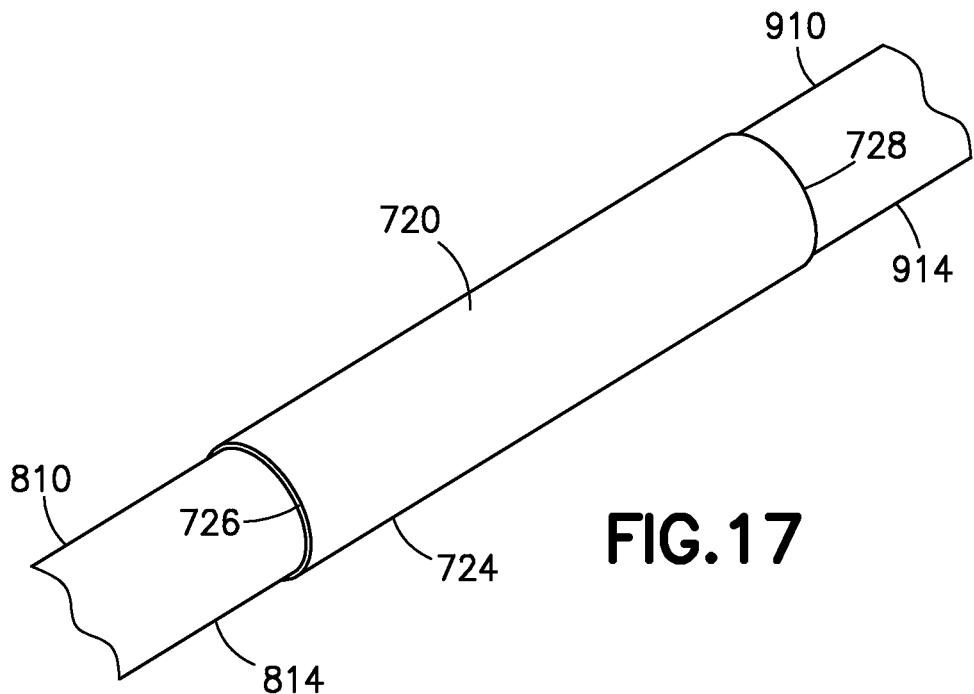
FIG. 17 is a perspective view of the outer sleeve type joiner of FIG. 16 coupling or joining together two axially aligned annular shaped leading edges in the form of a fiber reinforced polymer composite of the instant disclosure.
Figure 18:
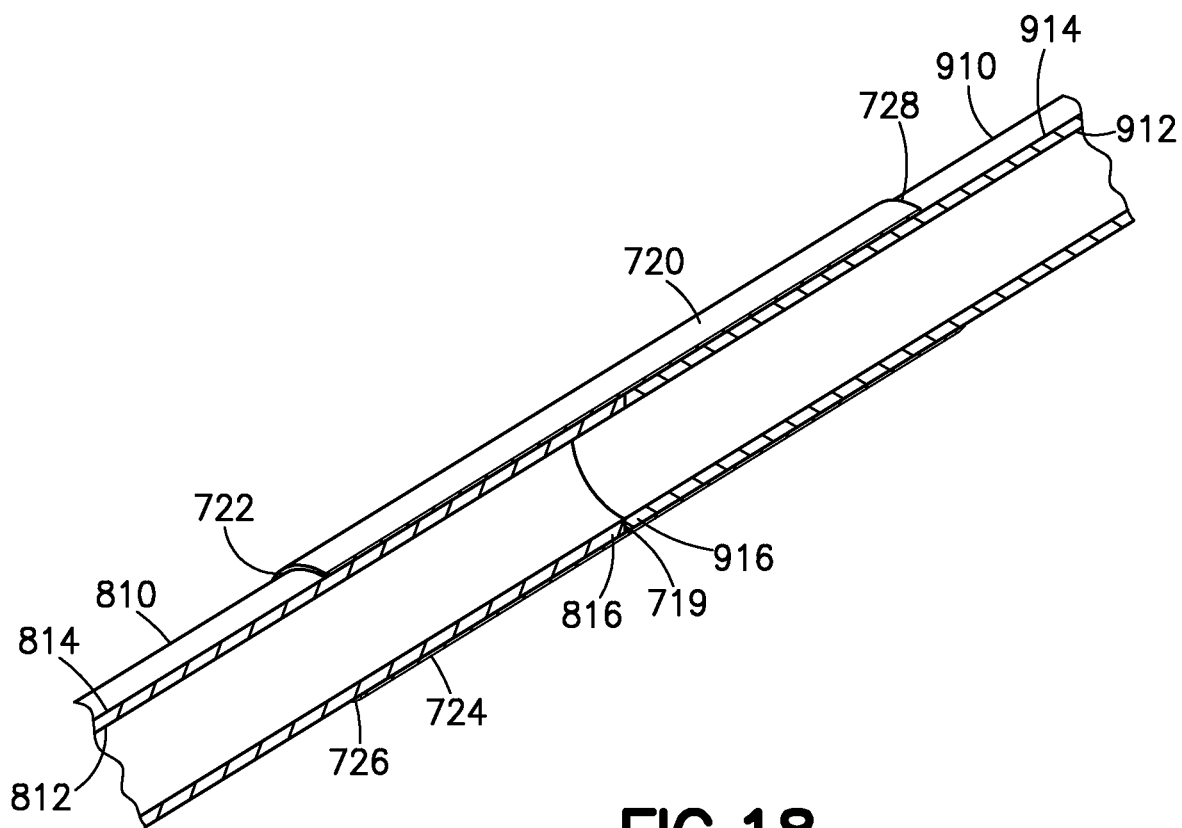
FIG. 18 is a perspective cross-sectional (cut-away) view of the outer sleeve type joiner of FIG. 16 coupling or joining together two axially aligned annular shaped leading edges in the form of a fiber reinforced polymer composite of the instant disclosure.

Referring to FIGS. 17 and 18, depicted are a perspective view and a perspective cross-sectional (cut-away) view respectively of the outer hollow-cylinder sleeve type joiner 720 of FIG. 16 coupling or joining together two axially aligned annular shaped leading edges in the form of a fiber reinforced polymer composite 810, 910 of the instant disclosure. The two axially aligned annular shaped leading edges 810, 910 are abutting against one another at their respective ends 816, 916 at point "P" 719, and the outer hollow cylinder sleeve type joiner 720 connects, couples or joins the two leading edges 810, 910 together. The outer hollow-cylinder sleeve type joiner 720 has an inside diameter 722 that is slightly greater than the outside diameters 814, 914 of the two leading edges 810, 910, such that the joiner 720 can be slid over the outside of the respective ends 816, 916 of the two leading edges 810, 910 and couple them together. The outer hollow-cylinder sleeve type joiner 720 is also positioned about equidistant within the two leading edges 810, 910, such that about one-half of the length "L" 729 of the joiner 720 is over one leading edge 810 and about one-half of the length "L" 729 of the joiner 720 is over the other leading edge 910.

EXAMPLES

Example 1—1¾ Inch Diameter Leading Edge

As discussed above, leading edges for pool or spa covers will deflect (bend) as a function of the design of the leading edge, the axial length (also referred to as the track space or length) of the leading edge, and the amount of load on the pool or spa cover. Deflection under no-load (just the weight of the bar itself causing a downward or "smile" type defection) of the leading edge was measured by setting the tube ends of the leading edge on simply supported rollers that themselves are laterally planar within +0.010/−0.010 inches, and the tube center is then measured relative to those planar ends (relative to a horizontal line between the ends of the tube) using calipers and/or micrometers and/or a laser-based measuring apparatus. Downward deflection under a water load of 50 pounds (6 gallons of water) was measured similarly by subjecting the bar to such a load or force in addition to the force of gravity.

Table 1 below shows the deflection in inches of a comparative leading edge (LE) and an inventive leading edge (LE) as a function of axial length for both no-load and a water load of 50 pounds (6 gallons of water) where both leading edges were 1¾ inch in outside diameter. The comparative and inventive leading edges were of an annular cross-sectional shape (tube) with 0.08" and 0.150" wall thicknesses, respectively. The comparative leading edge was fabricated from anodized aluminum. The inventive leading edge was a bi-directional prepreg carbon fiber-polymer composite (continuous fibers) with a composite density of 0.06 lbs/in$^3$ and a flexural modulus of 35×10$^6$ lbs/in$^2$. The matrix material for the inventive leading edge was epoxy. The inventive leading edge was a multi-layer laminate.

TABLE 1

| | Deflection in Inches | | | |
|---|---|---|---|---|
| Track Space, | 1¾" OD LE Comparative | | 1¾" OD LE Inventive | |
| Feet | No Load | Water Load | No Load | Water Load |
| 6 | 0.014 | 0.267 | 0.003 | 0.036 |
| 7 | 0.027 | 0.428 | 0.005 | 0.058 |
| 8 | 0.046 | 0.644 | 0.009 | 0.088 |
| 9 | 0.073 | 0.925 | 0.014 | 0.127 |
| 10 | 0.112 | 1.28 | 0.021 | 0.176 |
| 11 | 0.164 | 1.719 | 0.031 | 0.237 |
| 12 | 0.232 | 2.251 | 0.044 | 0.311 |
| 13 | 0.32 | 2.886 | 0.061 | 0.400 |
| 14 | 0.43 | 3.635 | 0.082 | 0.506 |
| 15 | 0.566 | 4.509 | 0.108 | 0.629 |
| 16 | 0.733 | 5.518 | 0.140 | 0.77 |
| 17 | 0.934 | 6.674 | 0.179 | 0.94 |

As can be seen in Table 1, the inventive fiber reinforced polymer composite leading edge has deflections both under no-load and under water load that are substantially lower than the comparative aluminum leading edge. For an axial length or track space of 10 feet, the comparative leading edge had a downward deflection of 0.112 inches under no load, whereas the inventive leading edge had a downward deflection of only 0.021 inches under no load. For a no-load condition, the inventive leading edge had a deflection of 5.3 times lower than the comparative leading edge. For an axial length or track space of 10 feet, the comparative leading edge had a downward deflection of 1.28 inches under water load, whereas the inventive leading edge had a downward deflection of only 0.176 inches under water load. For a water load condition, the inventive leading edge had a deflection of 7.2 times lower than the comparative leading edge.

Example 2—2½ Inch Diameter Leading Edge

Table 2 below shows the downward deflection in inches of a comparative leading edge and an inventive leading edge as a function of axial length for both no load and a water load of 50 pounds (6 gallons of water) where both leading edges were 2½ inch in outside diameter. The comparative and inventive leading edges were of an annular cross-sectional shape (tube) with 0.08" and 0.173" wall thicknesses, respectively. The comparative leading edge was fabricated from anodized aluminum. The inventive leading edge was a bi-directional prepreg carbon fiber-polymer composite (continuous fibers) with a composite density of 0.06 lbs/in$^3$ and a flexural modulus of 30×10$^6$ lbs/in$^2$. The matrix material for the inventive leading edge was epoxy. The inventive leading edge was a single-layer laminate.

TABLE 2

| | Deflection in Inches | | | |
|---|---|---|---|---|
| Track Space, | 2½" OD LE Comparative | | 2½" OD LE Inventive | |
| Feet | No Load | Water Load | No Load | Water Load |
| 10 | 0.048 | 0.438 | 0.009 | 0.053 |
| 11 | 0.071 | 0.59 | 0.014 | 0.072 |
| 12 | 0.1 | 0.774 | 0.019 | 0.095 |
| 13 | 0.138 | 0.995 | 0.026 | 0.122 |
| 14 | 0.186 | 1.256 | 0.036 | 0.155 |
| 15 | 0.245 | 1.561 | 0.047 | 0.194 |
| 16 | 0.317 | 1.914 | 0.061 | 0.24 |
| 17 | 0.404 | 2.32 | 0.077 | 0.29 |
| 18 | 0.508 | 2.782 | 0.097 | 0.35 |
| 19 | 0.63 | 3.305 | 0.005* | 0.032* |
| 20 | 0.774 | 3.894 | 0.009* | 0.053* |
| 21 | 0.941 | 4.552 | 0.011* | 0.062* |
| 22 | 1.133 | 5.285 | 0.014* | 0.072* |
| 23 | 1.354 | 6.098 | 0.016* | 0.083* |
| 24 | 1.605 | 6.995 | 0.019* | 0.095* |
| 25 | 1.889 | 7.982 | 0.023* | 0.108* |

As can be seen in Table 2, the inventive fiber reinforced polymer composite leading edge has downward deflections both under no-load and under water load that are substantially lower than the comparative aluminum leading edge. For an axial length or track space of 10 feet, the comparative leading edge had a deflection of 0.048 inches under no-load, whereas the inventive leading edge had a deflection of only 0.009 inches under no-load. For a no-load condition, the inventive leading edge had a deflection of 5.3 times lower than the comparative leading edge. For an axial length or track space of 10 feet, the comparative leading edge had a deflection of 0.438 inches under water load, whereas the inventive leading edge had a deflection of only 0.053 inches under water load. For a water load condition, the inventive leading edge had a deflection of 8.2 times lower than the comparative leading edge. The no-load and water load deflection values in Table 2 for track lengths of 19 to 25 feet for the inventive leading edges (indicated by a "*" in Table 2) demonstrate the extremely low deflections achieved with the use of and implementation of joiner technology with the inventive leading edges (as described in the Detailed Description above). For the inventive leading edges in Table 2 for axial lengths of 19 to 25 feet, a single inner hollow-cylinder type joiner with its outer diameter approximately 0.002 inches smaller than the inner diameter of the composite tube was used about midway the overall axial length to couple two segments of the inventive leading edges. The single inner hollow cylinder joiner used had an outside diameter of about 2 mil less than the inside diameter of the annular shaped leading edges and was made from anodized aluminum (aluminum 6061-T6). The length of the single joiner used for track lengths of 19 to 25 feet in Table 2 above was about 9 inches. This joiner technology may also be used in shorter track lengths to further decrease the deflections, such as for example, the track lengths 11 to 18 feet in Table 2.

Example 3—Comparative Fiber Glass Tube and Aluminum Tube Leading Edges Versus Inventive Carbon Fiber Polymer Composite Tube Leading Edge An inventive carbon fiber reinforced polymer composite leading edge tube, a comparative fiber glass leading edge tube and a comparative anodized aluminum leading edge tube of similar dimensions were evaluated for deflection performance. The inventive carbon fiber reinforced polymer composite leading edge was a bi-directional prepreg carbon fiber-polymer composite (continuous fibers) with a composite density of 0.06 lbs/in$^3$ and a flexural modulus of $30\times10^6$ lbs/in$^2$. The matrix material for the inventive leading edge was epoxy. The inventive leading edge was also a single-layer laminate structure.

The length, diameters and wall thicknesses of the three leading edges were comparable and are shown in Table 3 below. The downward deflections of the three tubes under no load were measured using the measurement method described in Example 1 above. The deflection results are also shown in Table 3 below.

tive to prior art aluminum tube and fiber glass tube leading edges.

Other Embodiments

A1. A pool and/or spa cover leading edge comprising: a fiber reinforced polymer composite with an axial length from 5 feet to 50 feet, wherein the composite includes at least one of continuous fibers or discontinuous fibers oriented at least partially in the axial direction, and wherein the at least one of continuous fibers or discontinuous fibers are encapsulated by a thermoset or thermoplastic resin matrix to provide a leading edge for coupling to a pool and/or spa cover that provides a no-load deflection across the width of the pool and/or spa of from 0 to less than or equal to 0.10 inches per 10 feet of width of the pool and/or spa, and wherein the leading edge has a linear weight per foot of from 4 to 14 ounces per foot of axial length.

A2. The leading edge of paragraph A1, wherein the at least one of continuous fibers or discontinuous fibers are selected from the group consisting of carbon fibers, aramid fibers, s-glass fibers, e-glass fibers, liquid crystal polymer (LCP) fibers, cellulose fibers, polyester fibers, polyphenylene sulfide (PPS) fibers, polyether ether ketone (PEEK) fibers, polyethylene fibers, polypropylene fibers, fluoropolymer fibers, polyamide fibers, and combinations thereof.

A3. The leading edge of paragraph A1 or A2, wherein the discontinuous fibers are chopped fibers, whisker fibers or additive fibers.

A4. The leading edge of paragraph A1 (or A2-A3), wherein the continuous fibers are multifilament fibers or monofilament fibers having a density ranging from 0.050 to 0.065 lbs/in$^3$ that are in a braided, woven, or two-dimensional laminate layup configuration.

A5. The leading edge of paragraph A4, wherein the continuous fibers are further oriented in at least one of the transverse directions, the hoop direction and the out-of-plane direction.

A6. The leading edge of paragraph A1 (or A2-A5), wherein the at least one of continuous fibers or discontinu-

TABLE 3

| Leading Edge Type | Comparative or Inventive | Outer Diameter, in | Wall Thickness, in | Inner Diameter, in | Tube Weight, lbs | Tube Length, ft | Deflection Inches | Linear Wgt. per foot (lb/ft)/(oz/ft) |
|---|---|---|---|---|---|---|---|---|
| Aluminum tube | Comparative | 1.75 | 0.085 | 1.580 | 12.38 | 20.0 | 1.00 | 0.619/9.90 |
| Fiber glass tube | Comparative | 1.9 | 0.200 | 1.500 | 18.04 | 20.0 | 0.86 | 0.902/14.43 |
| Composite tube | Inventive | 1.69 | 0.153 | 1.384 | 11.76 | 20.0 | 0.41 | 0.588/9.41 |

As can be seen in Table 3, the inventive carbon fiber composite leading edge tube provided the lowest deflection, which was 59% lower than the aluminum tube leading edge tube and 52% lower than the comparative fiber glass leading edge tube. Also as can be seen in Table 3, the inventive carbon fiber composite leading edge tube provided the lowest linear weight per foot, which was 5% lower than the aluminum tube leading edge tube and 35% lower than the comparative fiber glass leading edge tube. This example also demonstrates the surprising and unexpected improvement in deflection resistance of the inventive fiber reinforced polymer composite leading edges of the instant disclosure relaous fibers oriented at least partially in the axial direction include at least 40 percent of the fibers oriented in the axial direction of the leading edge.

A7. The leading edge paragraph A1 (or A2-A6), wherein the at least one of continuous fibers or discontinuous fibers comprise at least 25 wt. % of the leading edge.

A8. The leading edge of paragraph A1 (or A2-A7), wherein the cross-sectional shape of the fiber reinforced composite is selected from the group consisting of annular, hollow square, hollow rectangular, c-shaped, u-shaped, I-shaped, H-shaped, hollow triangular, hollow tear dropped, hollow air foil, hollow oval, hollow pentagonal, hollow, octagonal, hollow hexagonal, and hollow heptagonal.

A9. The leading edge of paragraph A8, wherein the cross-sectional shape of the fiber reinforced composite is annular with an outside diameter ranging from 0.25 inches to 3 inches.

A10. The leading edge of paragraph A9, wherein the wall thickness of the annual fiber reinforced composite ranges from 0.050 inches to 0.250 inches.

A11. The leading edge of paragraph A1 (or A2-A10), wherein the thermoset resin matrix is selected from the group consisting of polyester, epoxy, phenolic, vinyl ester, polyurethane, silicone, polyamide and polyamide-imide.

A12. The leading edge of paragraph A1 (or A2-A11), wherein the thermoplastic resin matrix is selected from the group consisting of polyester, polyamide, acrylonitrile butadiene styrene, polylactic acid, polycarbonate, polyether ether ketone, polyethylene, polypropylene, and polyvinyl chloride.

A13. The leading edge of paragraph A1 (or A2-A12) further including a UV inhibitor, absorber or stabilizer selected from the group consisting of carbon black, titanium dioxide, hydroxybenzophenone, hydroxyphenylbenzotriazole, oxanilides, benzophenones, benzotriazoles, hydroxyphenyltriazines, nickel quenchers and hindered amine light stabilizers (HALS).

A14. The leading edge of paragraph A13, wherein the UV inhibitor, absorber or stabilizer is an additive to the fiber reinforced polymer composite, or a coating applied to the outside surfaces of the leading edge.

A15. The leading edge of paragraph A1 (or A2-A14) further including a luff groove for attachment of the pool and/or spa cover to the leading edge.

A16. The leading edge of paragraph A15, wherein the luff groove is of a shape selected from the group consisting of annular, c-shaped, hollow square, hollow rectangular, and hollow triangular.

A17. The leading edge of paragraph A15, wherein the luff groove is integral to the fiber reinforced polymer composite or is attached to the fiber reinforced polymer composite with an adhesive, mechanical fasteners, rivets, screws or high strength bonding tape.

A18. The leading edge of paragraph A1 (or A2-A17), wherein the leading edge coupled to a pool cover in an open or closed position on a pool and/or spa is in the shape of a smile or a frown across the width of the pool and/or spa relative to the coping of the pool and/or spa and the surface of the water in the pool and/or spa.

A19. The leading edge of paragraph A18, wherein leading edge is above the surface of the water in the pool and/or spa when the pool cover is in an open or closed position on the pool and/or spa.

A20. The leading edge of paragraph A10 further including at least one additional annular fiber reinforced composite with an axial length from 5 feet to 50 feet, wherein the two or more annular fiber reinforced composites are axially aligned at their ends with a joiner coupling together each pair of the annular fiber reinforced composites to form a segmented leading edge.

A21. The leading edge of paragraph A20, wherein the joiner is a solid or hollow cylinder having a length from 5 inches to 12 inches and is made from aluminum or a thermoplastic or thermoset material selected from the group consisting of polyester, polyamide, acrylonitrile butadiene styrene, polylactic acid, polycarbonate, polyether ether ketone, polyethylene, polypropylene, and polyvinyl chloride, epoxy, phenolic, vinyl ester, polyurethane, silicone, and polyamide-imide.

A22. The leading edge of paragraph A21, wherein the joiner is positioned as a plug inside the two or more annular fiber reinforced composites axially aligned at their ends and has an outside diameter that is from 1 mil to 10 mil less than the inside diameter of the annular fiber reinforced composites.

A23. The leading edge of paragraph A21, wherein the joiner is positioned as a sleeve over the two or more annular fiber reinforced composites aligned at their ends and has an inside diameter that is from 1 mil to 10 mil greater than the outside diameter of the annular fiber reinforced composites.

A24. The leading edge of paragraph A20 (or A21-A23), wherein the joiner used for coupling together each pair of the annular fiber reinforced composites is provided for each incremental pool and/or spa width of from 5 to 20 feet.

A25. The leading edge of paragraph A1 (or A2-A24), wherein the fiber reinforced composite is made by a process selected from the group consisting of conventional 2-D layup, roll forming, pultrusion, single filament winding, vacuum bagging, extrusion, injection molding and resin transfer molding (RTM).

B1. A pool and/or spa cover system for a pool and/or spa comprising: a pool and/or spa cover; a leading edge coupled to the front end of the pool and/or spa cover, wherein the leading edge comprises a fiber reinforced polymer composite with an axial length from 5 feet to 50 feet, wherein the composite includes at least one of continuous fibers or discontinuous fibers oriented at least partially in the axial direction, and wherein the at least one of continuous fibers or discontinuous fibers are encapsulated by a thermoset or thermoplastic resin matrix to provide a leading edge for coupling to a pool and/or spa cover that provides a no-load deflection across the width of the pool and/or spa of from 0 to less than or equal to 0.10 inches per 10 feet of width of the pool and/or spa and wherein the leading edge has a linear weight per foot of from 4 to 14 ounces per foot of axial length; a roller drum coupled to the back end of the pool and/or spa cover for storing, winding and unwinding the pool and/or spa cover; a drive assembly including an electric or hydraulic motor coupled to the roller drum for rotating the roller drum in the forward and reverse direction; a parallel track channel assembly coupled to the side walls of the pool and/or spa between the surface of the water and the coping for guiding the pool and/or spa cover across the length of the pool and/or spa; a pump for removing water from the top surface of the pool cover when in the closed position; and a control assembly for the drive assembly for providing a user interface for the opening or closing of the pool and/or spa cover.

B2. The pool and/or spa cover system of paragraph B1, wherein the pool and/or spa cover comprises polyvinyl chloride.

B3. The pool and/or spa cover system of paragraph B1 or B2, wherein the roller drum comprises anodized aluminum or stainless steel.

B4. The pool and/or spa cover system of paragraph B1 (or B2-B3), wherein the parallel track channel assembly includes a channel with a linear track enclosed within the channel, a shim at the bottom of the channel, a pulley at one end of the track channel assembly, a guide at the other end of the track channel assembly and a rope or cable for sliding the leading edge of the pool and/or spa cover along the linear track of the channel.

B5. The pool and/or spa cover system of paragraph B1 (or B2-B4), wherein the parallel track channel assembly is a wall mounted track assembly, an encapsulated track assembly or an in-wall track assembly.

B6. The pool and/or spa cover system of paragraph B1 (or B2-B5), wherein the electric motor is a constant speed alternating current type motor.

B7. The pool and/or spa cover system of paragraph B1 (or B2-B6), wherein the at least one of continuous fibers or discontinuous fibers of the fiber reinforced polymer composite are selected from the group consisting of carbon fibers, aramid fibers, s-glass fibers, e-glass fibers, liquid crystal polymer (LCP) fibers, cellulose fibers, polyester fibers, polyphenylene sulfide (PPS) fibers, polyether ether ketone (PEEK) fibers, polyethylene fibers, polypropylene fibers, fluoropolymer fibers, polyamide fibers, and combinations thereof.

B8. The pool and/or spa cover system of paragraph B1 (or B2-B7), wherein the discontinuous fibers of the fiber reinforced polymer composite are chopped fibers, whisker fibers or additive fibers.

B9. The pool and/or spa cover system of paragraph B1 (or B2-B8), wherein the continuous fibers of the fiber reinforced polymer composite are multifilament fibers or monofilament fibers having a density ranging from 0.050 to 0.065 lbs/in$^3$ that are in a braided, woven, or two-dimensional laminate layup configuration.

B10. The pool and/or spa cover system of paragraph B9, wherein the continuous fibers of the fiber reinforced polymer composite are further oriented in at least one of the transverse directions, the hoop direction and the out-of-plane direction.

B11. The pool and/or spa cover system of paragraph B1 (or B2-B10), wherein the at least one of continuous fibers or discontinuous fibers oriented at least partially in the axial direction include at least 40 percent of the fibers oriented in the axial direction of the leading edge.

B12. The pool and/or spa cover system of paragraph B1 (or B2-B11), wherein the at least one of continuous fibers or discontinuous fibers of the leading edge comprise at least 25 wt. % of the leading edge.

B13. The pool and/or spa cover system of paragraph B1 (or B2-B12), wherein the cross-sectional shape of the fiber reinforced polymer composite is selected from the group consisting of annular, hollow square, hollow rectangular, c-shaped, u-shaped, I-shaped, H-shaped, hollow triangular, hollow tear dropped, hollow air foil, hollow oval, hollow pentagonal, hollow, octagonal, hollow hexagonal, and hollow heptagonal.

B14. The pool and/or spa cover system of paragraph B13, wherein the cross-sectional shape of the fiber reinforced polymer composite is annular with an outside diameter ranging from 0.25 inches to 3 inches.

B15. The pool and/or spa cover system of paragraph B14, wherein the wall thickness of the annular fiber reinforced polymer composite ranges from 0.050 inches to 0.250 inches.

B16. The pool and/or spa cover system of paragraph B1 (or B2-B15), wherein the thermoset resin matrix of the leading edge is selected from the group consisting of polyester, epoxy, phenolic, vinyl ester, polyurethane, silicone, polyamide and polyamide-imide.

B17. The pool and/or spa cover system of paragraph B1 (or B2-B16), wherein the thermoplastic resin matrix of the fiber reinforced polymer composite is selected from the group consisting of polyester, polyamide, acrylonitrile butadiene styrene, polylactic acid, polycarbonate, polyether ether ketone, polyethylene, polypropylene, and polyvinyl chloride.

B18. The pool and/or spa cover system of paragraph B1 (or B2-B17), wherein the leading edge further includes a UV inhibitor, absorber or stabilizer selected from the group consisting of carbon black, titanium dioxide, hydroxybenzophenone, hydroxyphenylbenzotriazole, oxanilides, benzophenones, benzotriazoles, hydroxyphenyltriazines, nickel quenchers and hindered amine light stabilizers (HALS).

B19. The pool and/or spa cover system of paragraph B18, wherein the UV inhibitor, absorber or stabilizer is an additive to the fiber reinforced polymer composite or a coating applied to the outside surfaces of the leading edge.

B20. The pool and/or spa cover system of paragraph B1 (or B2-B19), wherein the leading edge further includes a luff groove track for attachment of the pool and/or spa cover to the leading edge.

B21. The pool and/or spa cover system of paragraph B20, wherein the luff groove is of a shape selected from the group consisting of annular, c-shaped, hollow square, hollow rectangular, and hollow triangular.

B22. The pool and/or spa cover system of paragraph B21, wherein the luff groove is integral to the leading edge or is attached to the leading edge with an adhesive, mechanical fasteners, rivets, screws or high strength bonding tape.

B23. The pool and/or spa cover system of paragraph B1 (or B2-B22), wherein the leading edge coupled to a pool cover in an open or closed position on a pool and/or spa is in the shape of a smile or a frown across the width of the pool and/or spa relative to the coping of the pool and/or spa and the surface of the water in the pool and/or spa.

B24. The pool and/or spa cover system of paragraph B23, wherein leading edge is above the surface of the water in the pool and/or spa when the pool cover is in an open or closed position on the pool and/or spa.

B25. The pool and/or spa cover system of paragraph B15 further including at least one additional annular fiber reinforced composite with an axial length from 10 feet to feet, wherein the two or more annular fiber reinforced composites are axially aligned at their ends with a joiner coupling together each pair of the annular fiber reinforced composites to form a segmented leading edge.

B26. The pool and/or spa cover system of paragraph B25, wherein the joiner is a solid or hollow cylinder having a length from 5 inches to 12 inches and is made from aluminum or a thermoplastic or thermoset material selected from the group consisting of polyester, polyamide, acrylonitrile butadiene styrene, polylactic acid, polycarbonate, polyether ether ketone, polyethylene, polypropylene, and polyvinyl chloride, epoxy, phenolic, vinyl ester, polyurethane, silicone, and polyamide-imide.

B27. The pool and/or spa cover system of paragraph B26, wherein the joiner is positioned as a plug inside the two or more annular fiber reinforced composites axially aligned at their ends and has an outside diameter that is from 1 mil to 10 mil less than the inside diameter of the annular fiber reinforced composites.

B28. The pool and/or spa cover system of paragraph B26, wherein the joiner is positioned as a sleeve over the two or more annular fiber reinforced composites aligned at their ends and has an inside diameter that is from 1 mil to 10 mil greater than the outside diameter of the annular fiber reinforced composites.

B29. The pool and/or spa cover system of paragraph B25 (or B26-B28), wherein the joiner used for coupling together each pair of the annular fiber reinforced composites is provided for each incremental pool and/or spa width of from 5 to 20 feet.

B30. The pool and/or spa cover system of paragraph B1 (or B2-B29), wherein the fiber reinforced polymer composite is made by a process selected from the group consisting of conventional 2-D layup, roll forming, pultrusion, single filament winding, vacuum bagging, extrusion, injection molding and resin transfer molding (RTM).

B31. The pool and/or spa cover system of paragraph B1 (or B2-B30) further including adaptive hardware for interconnecting the ends of the leading edge to the parallel track channel assembly.

C1. A method of reducing the deflection of a leading edge for a pool and/or spa cover comprising: providing a pool and/or spa cover with a leading edge coupled to the front end of the pool and/or spa cover, wherein the leading edge comprises a fiber reinforced polymer composite with an axial length from 5 feet to 50 feet, wherein the composite includes at least one of continuous fibers or discontinuous fibers oriented at least partially in the axial direction, and wherein the at least one of continuous fibers or discontinuous fibers are encapsulated by a thermoset or thermoplastic resin matrix, and upon opening or closing the pool and/or spa cover, the no-load deflection of the leading edge coupled to the pool and/or spa cover across the width of the pool and/or spa ranges from 0 to less than or equal to 0.10 inches per 10 feet of width of the pool and/or spa, and wherein the leading edge has a linear weight per foot of from 4 to 14 ounces per foot of axial length.

C2. The method of paragraph C1, wherein the at least one of continuous fibers or discontinuous fibers are selected from the group consisting of carbon fibers, aramid fibers, s-glass fibers, e-glass fibers, liquid crystal polymer (LCP) fibers, cellulose fibers, polyester fibers, polyphenylene sulfide (PPS) fibers, polyether ether ketone (PEEK) fibers, polyethylene fibers, polypropylene fibers, fluoropolymer fibers, polyamide fibers, and combinations thereof.

C3. The method of paragraph C1 or C2, wherein the discontinuous fibers are chopped fibers, whisker fibers or additive fibers.

C4. The method of paragraph C1 (or C2-C3), wherein the continuous fibers are multifilament fibers or monofilament fibers having a density ranging from 0.050 to 0.065 lbs/in$^3$ that are in a braided, woven, or two-dimensional laminate layup configuration.

C5. The method of paragraph C4, wherein the continuous fibers are further oriented in at least one of the transverse directions, the hoop direction and the out-of-plane direction.

C6. The method of paragraph C1 (or C2-05), wherein the at least one of continuous fibers or discontinuous fibers oriented at least partially in the axial direction include at least 40 percent of the fibers oriented in the axial direction of the leading edge.

C7. The method paragraph C1 (or C2-C6), wherein the at least one of continuous fibers or discontinuous fibers comprise at least 25 wt. % of the leading edge.

C8. The method of paragraph C1 (or C2-C7), wherein the cross-sectional shape of the fiber reinforced polymer composite is selected from the group consisting of annular, hollow square, hollow rectangular, c-shaped, u-shaped, I-shaped, H-shaped, hollow triangular, hollow tear dropped, hollow air foil, hollow oval, hollow pentagonal, hollow, octagonal, hollow hexagonal, and hollow heptagonal.

C9. The method of paragraph C8, wherein the cross-sectional shape of the fiber reinforced polymer composite is annular with an outside diameter ranging from 0.25 inches to 3 inches.

C10. The method of paragraph C9, wherein the wall thickness of the annular fiber reinforced polymer composite ranges from 0.050 inches to 0.250 inches.

C11. The method of paragraph C1 (or C2-C10), wherein the thermoset resin matrix is selected from the group consisting of polyester, epoxy, phenolic, vinyl ester, polyurethane, silicone, polyamide and polyamide-imide.

C12. The method of paragraph C1 (or C2-C11), wherein the thermoplastic resin matrix is selected from the group consisting of polyester, polyamide, acrylonitrile butadiene styrene, polylactic acid, polycarbonate, polyether ether ketone, polyethylene, polypropylene, and polyvinyl chloride.

C13. The method of paragraph C1 (or C2-C12), wherein the leading edge further includes a UV inhibitor, absorber or stabilizer selected from the group consisting of carbon black, titanium dioxide, hydroxybenzophenone, hydroxyphenylbenzotriazole, oxanilides, benzophenones, benzotriazoles, hydroxyphenyltriazines, nickel quenchers and hindered amine light stabilizers (HALS).

C14. The method of paragraph C13, wherein the UV inhibitor, absorber or stabilizer is an additive to the fiber reinforced polymer composite, or a coating applied to the outside surfaces of the leading edge.

C15. The method of paragraph C1 (or C2-C14) wherein the leading edge further includes a luff groove for attachment of the pool and/or spa cover to the leading edge.

C16. The method of paragraph C15, wherein the luff groove is of a shape selected from the group consisting of annular, c-shaped, hollow square, hollow rectangular, and hollow triangular.

C17. The method of paragraph C15, wherein the luff groove is integral to the leading edge or is attached to the leading edge with an adhesive, mechanical fasteners, rivets, screws or high strength bonding tape.

C18. The method of paragraph C1 (or C2-C17), wherein the leading edge coupled to a pool cover in an open or closed position on a pool and/or spa is in the shape of a smile or a frown across the width of the pool and/or spa relative to the coping of the pool and/or spa and the surface of the water in the pool and/or spa.

C19. The method of paragraph C18, wherein leading edge is above the surface of the water in the pool and/or spa when the pool cover is in an open or closed position on the pool and/or spa.

C20. The method of paragraph C10 further including at least one additional annular fiber reinforced composite with an axial length from 5 feet to 50 feet, wherein the two or more annular fiber reinforced composites are axially aligned at their ends with a joiner coupling together each pair of the annular fiber reinforced composites to form a segmented leading edge.

C21. The method of paragraph C20, wherein the joiner is a solid or hollow cylinder having a length from 5 inches to 12 inches and is made from aluminum or a thermoplastic or thermoset material selected from the group consisting of polyester, polyamide, acrylonitrile butadiene styrene, polylactic acid, polycarbonate, polyether ether ketone, polyethylene, polypropylene, and polyvinyl chloride, epoxy, phenolic, vinyl ester, polyurethane, silicone, and polyamide-imide.

C22. The method of paragraph C21, wherein the joiner is positioned as a plug inside the two or more annular fiber reinforced composites axially aligned at their ends and has an outside diameter that is from 1 mil to 10 mil less than the inside diameter of the annular fiber reinforced composites.

C23. The method of paragraph C21, wherein the joiner is positioned as a sleeve over the two or more annular fiber reinforced composites aligned at their ends and has an inside diameter that is from 1 mil to 10 mil greater than the outside diameter of the annular fiber reinforced composites.

C24. The method of paragraph C20 (or C21-C23), wherein the joiner used for coupling together each pair of the annular fiber reinforced composites is provided for each incremental pool and/or spa width of from 5 to 20 feet.

C25. The method of paragraph C1 (or C2-C24), wherein the fiber reinforced polymer composite is made by a process selected from the group consisting of conventional 2-D layup, roll forming, pultrusion, single filament winding, vacuum bagging, extrusion, injection molding and resin transfer molding (RTM).

D1. A pool and/or spa cover leading edge kit, the kit comprising: at least two annular shaped fiber reinforced polymer composites capable of being axially aligned and interconnected at abutting ends with each annular shaped fiber reinforced polymer composite having an axial length of from 3 feet to 20 feet, at least one joiner capable of interconnecting together a pair of axially aligned annular shaped fiber reinforced polymer composites at abutting axial ends to form a segmented leading edge with an axial length of from 6 feet to 50 feet that is capable of being coupled to a pool and/or spa cover, wherein the at least two annular shaped fiber reinforced polymer composites include at least one of continuous fibers or discontinuous fibers oriented at least partially in the axial direction and encapsulated by a thermoset or thermoplastic resin matrix, wherein the segmented leading edge capable of being coupled to a pool and/or spa cover provides a no-load deflection across the width of the pool and/or spa of from 0 to less than or equal to 0.10 inches per 10 feet of width of the pool and/or spa, and wherein the segmented leading edge has a linear weight per foot of from 4 to 14 ounces per foot of axial length.

D2. The kit of paragraph D1, wherein the at least one joiner is a solid or hollow cylinder having an axial length of from 5 inches to 12 inches.

D3. The kit of paragraph D1 or D2, wherein the at least one joiner is made from aluminum or a thermoplastic or thermoset material selected from the group consisting of polyester, polyamide, acrylonitrile butadiene styrene, polylactic acid, polycarbonate, polyether ether ketone, polyethylene, polypropylene, and polyvinyl chloride, epoxy, phenolic, vinyl ester, polyurethane, silicone, and polyamide-imide.

D4. The kit of paragraph D1 (or D2-D3), wherein the at least one joiner comprises a plug inside the pair of abutting axially aligned annular shaped fiber reinforced polymer composites with an outside diameter that is from 1 mil to 10 mil less than the inside diameter of the pair of abutting axially aligned annular shaped fiber reinforced polymer composites.

D5. The kit of paragraph D1 (or D2-D4), wherein the at least one joiner comprises a sleeve over the pair of abutting axially aligned annular shaped fiber reinforced polymer composites with an inside diameter that is from 1 mil to 10 mil greater than the outside diameter of the pair of abutting axially aligned annular shaped fiber reinforced polymer composites.

D6. The kit of paragraph D1 (or D2-D5), wherein the at least one of continuous fibers or discontinuous fibers are selected from the group consisting of carbon fibers, aramid fibers, s-glass fibers, e-glass fibers, liquid crystal polymer (LCP) fibers, cellulose fibers, polyester fibers, polyphenylene sulfide (PPS) fibers, polyether ether ketone (PEEK) fibers, polyethylene fibers, polypropylene fibers, fluoropolymer fibers, polyamide fibers, and combinations thereof.

D7. The kit of paragraph D1 (or D2-D6), wherein the continuous fibers are multifilament fibers or monofilament fibers having a density ranging from 0.050 to 0.065 lbs/in3 that are in a braided, woven, or two-dimensional laminate layup configuration.

D8. The kit of paragraph D1 (or D2-D7), wherein the continuous fibers are further oriented in at least one of the transverse direction, the hoop direction and the out-of-plane direction.

D9. The kit of paragraph D1 (or D2-D8), wherein the at least one of continuous fibers or discontinuous fibers oriented at least partially in the axial direction include at least 40 percent of the fibers oriented in the axial direction of the segmented leading edge.

D10. The kit of paragraph D1 (or D2-D9), wherein the at least one of continuous fibers or discontinuous fibers comprise at least 25 wt. % of the segmented leading edge.

D11. The kit of paragraph D1 (or D2-D10), wherein the at least two annular shaped fiber reinforced polymer composites have an outside diameter ranging from 0.25 inches to 3 inches and a wall thickness ranging from 0.050 inches to 0.250 inches.

D12. The kit of paragraph D1 (or D2-D11), wherein the thermoset or thermoplastic resin matrix is selected from the group consisting of polyester, polyamide, acrylonitrile butadiene styrene, polylactic acid, polycarbonate, polyether ether ketone, polyethylene, polypropylene, and polyvinyl chloride, epoxy, phenolic, vinyl ester, polyurethane, silicone, and polyamide-imide.

D13. The kit of paragraph D1 (or D2-D12), wherein the least two annular shaped fiber reinforced polymer composites further include a UV inhibitor, absorber or stabilizer.

D14. The kit of paragraph D13, wherein the UV inhibitor, absorber or stabilizer is an additive to the composites or a coating applied to the outside surfaces of the composites.

D15. The kit of paragraph D13, wherein the UV inhibitor, absorber or stabilizer is selected from the group consisting of carbon black, titanium dioxide, hydroxybenzophenone, hydroxyphenylbenzotriazole, oxanilides, benzophenones, benzotriazoles, hydroxyphenyltriazines, nickel quenchers and hindered amine light stabilizers (HALS).

D16. The kit of paragraph D1 (or D2-D15) further including at least two luff grooves capable of being attached to the outside surface of the at least two annular shaped fiber reinforced polymer composites or are integral to the outside surface of the at least two annular shaped fiber reinforced polymer composites.

D17. The kit of paragraph D1 (or D2-D16) further including an adhesive, mechanical fasteners, rivets, screws or high strength bonding tape for attaching the at least two luff grooves to the outside surface of the at least two annular shaped fiber reinforced polymer composites.

D18. The kit of paragraph D16, wherein the at least two luff grooves are of a shape selected from the group consisting of annular, c-shaped, hollow square, hollow rectangular, and hollow triangular.

D19. The kit of paragraph D1 (or D2-D18), wherein the segmented leading edge when coupled to a pool and/or spa cover is above the surface of the water in the pool and/or spa when the pool cover is in an open or closed position.

D20. The kit of paragraph D1 (or D2-D19), wherein the segmented leading edge when coupled to a pool and/or spa cover is in the shape of a smile or a frown across the width of the pool and/or spa relative to the coping of the pool and/or spa and the surface of the water in the pool and/or spa.

D21. The kit of paragraph D1 (or D2-D20), wherein the at least two annular shaped fiber reinforced polymer composites are made by a process selected from the group consisting of conventional 2-D layup, roll forming, pultrusion, single filament winding, vacuum bagging, extrusion, injection molding and resin transfer molding (RTM).

E1. A method of reducing the deflection of a leading edge for a pool or spa cover comprising: providing a pool or spa cover leading edge kit to a pool or spa site, the kit comprising: at least two annular shaped fiber reinforced polymer composites capable of being axially aligned and interconnected at abutting ends with each annular shaped fiber reinforced polymer composite having an axial length of from 3 feet to 20 feet, at least one joiner capable of interconnecting together a pair of axially aligned annular shaped fiber reinforced polymer composites at abutting axial ends to form a segmented leading edge with an axial length of from 6 feet to 50 feet that is capable of being coupled to a pool or spa cover, wherein the at least two annular shaped fiber reinforced polymer composites include at least one of continuous fibers or discontinuous fibers oriented at least partially in the axial direction and encapsulated by a thermoset or thermoplastic resin matrix; assembling the leading edge kit at the pool or spa site to provide an assembled leading edge that is about equal in length to the width of the pool or spa cover; coupling the assembled leading edge to the front end of the pool or spa cover; wherein the assembled and coupled leading edge provides a deflection across the width of the pool or spa of from 0 to less than or equal to 0.10 inches per 10 feet of width of the pool or spa, and wherein the assembled and coupled leading edge has a linear weight per foot of from 4 to 14 ounces per foot of axial length.

E2. The method of paragraph E1, wherein the at least one joiner is a solid or hollow cylinder having an axial length of from 5 inches to 12 inches.

E3. The method of paragraph E1 or E2, wherein the at least one joiner is made from aluminum or a thermoplastic or thermoset material selected from the group consisting of polyester, polyamide, acrylonitrile butadiene styrene, polylactic acid, polycarbonate, polyether ether ketone, polyethylene, polypropylene, and polyvinyl chloride, epoxy, phenolic, vinyl ester, polyurethane, silicone, and polyamide-imide.

E4. The method of paragraph E1 (or E2-E3), wherein the at least one joiner comprises a plug inside the pair of abutting axially aligned annular shaped fiber reinforced polymer composites with an outside diameter that is from 1 mil to 10 mil less than the inside diameter of the pair of abutting axially aligned annular shaped fiber reinforced polymer composites.

E5. The method of paragraph E1 (or E2-E4), wherein the at least one joiner comprises a sleeve over the pair of abutting axially aligned annular shaped fiber reinforced polymer composites with an inside diameter that is from 1 mil to 10 mil greater than the outside diameter of the pair of abutting axially aligned annular shaped fiber reinforced polymer composites.

E6. The method of paragraph E1 (or E2-E5), wherein the pool or spa cover leading edge kit further includes at least two luff grooves capable of being attached to the outside surface of the at least two annular shaped fiber reinforced polymer composites or are integral to the outside surface of the at least two annular shaped fiber reinforced polymer composites.

E7. The method of paragraph E6, wherein the at least two luff grooves are of a shape selected from the group consisting of annular, c-shaped, hollow square, hollow rectangular, and hollow triangular.

E8. The method of paragraph E6, wherein the pool or spa cover leading edge kit further includes an adhesive, mechanical fasteners, rivets, screws or high strength bonding tape for attaching the at least two luff grooves to the outside surface of the at least two annular shaped fiber reinforced polymer composites.

E9. The method of paragraph E1 (or E2-E8), wherein the assembled and coupled leading edge is above the surface of the water in the pool or spa when the pool or spa cover is in an open or closed position.

E10. The method of paragraph E1 (or E2-E9), wherein the assembled and coupled leading edge is in the shape of a smile or a frown across the width of the pool or spa relative to the coping of the pool or spa and the surface of the water in the pool or spa.

E11. The method of paragraph E1 (or E2-E10), wherein the at least one of continuous fibers or discontinuous fibers are selected from the group consisting of carbon fibers, aramid fibers, s-glass fibers, e-glass fibers, liquid crystal polymer (LCP) fibers, cellulose fibers, polyester fibers, polyphenylene sulfide (PPS) fibers, polyether ether ketone (PEEK) fibers, polyethylene fibers, polypropylene fibers, fluoropolymer fibers, polyamide fibers, and combinations thereof.

E12. The method of paragraph E1 (or E2-E11), wherein the continuous fibers are multifilament fibers or monofilament fibers having a density ranging from 0.050 to 0.065 lbs/in3 that are in a braided, woven, or two-dimensional laminate layup configuration.

E13. The method of paragraph E1 (or E2-E12), wherein the continuous fibers are further oriented in at least one of the transverse direction, the hoop direction and the out-of-plane direction.

E14. The method of paragraph E1 (or E2-E13), wherein the at least one of continuous fibers or discontinuous fibers oriented at least partially in the axial direction include at least 40 percent of the fibers oriented in the axial direction of the segmented leading edge.

E15. The method of paragraph E1 (or E2-E14), wherein the at least one of continuous fibers or discontinuous fibers comprise at least 25 wt. % of the segmented leading edge.

E16. The method of paragraph E1 (or E2-E15), wherein the at least two annular shaped fiber reinforced polymer composites have an outside diameter ranging from 0.25 inches to 3 inches and a wall thickness ranging from 0.050 inches to 0.250 inches.

E17. The method of paragraph E1 (or E2-E16), wherein the thermoset or thermoplastic resin matrix is selected from the group consisting of polyester, polyamide, acrylonitrile butadiene styrene, polylactic acid, polycarbonate, polyether ether ketone, polyethylene, polypropylene, and polyvinyl chloride, epoxy, phenolic, vinyl ester, polyurethane, silicone, and polyamide-imide.

E18. The method of paragraph E1 (or E2-E17), wherein the least two annular shaped fiber reinforced polymer composites further include a UV inhibitor, absorber or stabilizer.

E19. The method of paragraph E18, wherein the UV inhibitor, absorber or stabilizer is an additive to the composites or a coating applied to the outside surfaces of the composites.

E20. The method of paragraph E18, wherein the UV inhibitor, absorber or stabilizer is selected from the group consisting of carbon black, titanium dioxide, hydroxybenzophenone, hydroxyphenylbenzotriazole, oxanilides, benzophenones, benzotriazoles, hydroxyphenyltriazines, nickel quenchers and hindered amine light stabilizers (HALS).

E21. The method of paragraph E1 (or E2-E20), wherein the at least two annular shaped fiber reinforced polymer composites are made by a process selected from the group consisting of conventional 2-D layup, roll forming, pultrusion, single filament winding, vacuum bagging, extrusion, injection molding and resin transfer molding (RTM).

It should be understood that the foregoing description is only illustrative of the aspects of the disclosed embodiment and that the aspects of the disclosed embodiment can be used individually or in any suitable combination thereof. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the disclosure.

All patents, test procedures, and other documents cited herein, including priority documents, are fully incorporated by reference to the extent such disclosure is not inconsistent with this disclosure and for all jurisdictions in which such incorporation is permitted. When numerical lower limits and numerical upper limits are listed herein, ranges from any lower limit to any upper limit are contemplated. Those skilled in the art will recognize, or able to ascertain using no more than routine experimentation, many equivalents to the specific embodiments and methods described herein. Such equivalents are intended to be encompassed by the scope of the following claims.

The invention claimed is:

1. A pool and/or spa cover leading edge kit, the kit comprising:
   at least two annular shaped fiber reinforced polymer composites capable of being axially aligned and interconnected at abutting ends with each annular shaped fiber reinforced polymer composite having an axial length of from 3 feet to 20 feet,
   at least one joiner capable of interconnecting together a pair of axially aligned annular shaped fiber reinforced polymer composites at abutting axial ends to form a segmented leading edge with an axial length of from 6 feet to 50 feet that is capable of being coupled to a pool and/or spa cover,
   wherein the at least two annular shaped fiber reinforced polymer composites include at least one of continuous fibers or discontinuous fibers oriented at least partially in the axial direction and encapsulated by a thermoset or thermoplastic resin matrix,
   wherein the segmented leading edge capable of being coupled to a pool and/or spa cover provides a deflection across the width of the pool and/or spa of from 0 to less than or equal to 0.10 inches per 10 feet of width of the pool and/or spa, and wherein the segmented leading edge has a linear weight per foot of from 4 to 14 ounces per foot of axial length.

2. The kit of claim 1, wherein the at least one joiner is a solid or hollow cylinder having an axial length of from 5 inches to 12 inches.

3. The kit of claim 1, wherein the at least one joiner is made from aluminum or a thermoplastic or thermoset material selected from the group consisting of polyester, polyamide, acrylonitrile butadiene styrene, polylactic acid, polycarbonate, polyether ether ketone, polyethylene, polypropylene, and polyvinyl chloride, epoxy, phenolic, vinyl ester, polyurethane, silicone, and polyamide-imide.

4. The kit of claim 1, wherein the at least one joiner comprises a plug inside the pair of abutting axially aligned annular shaped fiber reinforced polymer composites with an outside diameter that is from 1 mil to 10 mil less than the inside diameter of the pair of abutting axially aligned annular shaped fiber reinforced polymer composites.

5. The kit of claim 1, wherein the at least one joiner comprises a sleeve over the pair of abutting axially aligned annular shaped fiber reinforced polymer composites with an inside diameter that is from 1 mil to 10 mil greater than the outside diameter of the pair of abutting axially aligned annular shaped fiber reinforced polymer composites.

6. The kit of claim 1, wherein the at least one of continuous fibers or discontinuous fibers are selected from the group consisting of carbon fibers, aramid fibers, s-glass fibers, e-glass fibers, liquid crystal polymer (LCP) fibers, cellulose fibers, polyester fibers, polyphenylene sulfide (PPS) fibers, polyether ether ketone (PEEK) fibers, polyethylene fibers, polypropylene fibers, fluoropolymer fibers, polyamide fibers, and combinations thereof.

7. The kit of claim 1, wherein the continuous fibers are multifilament fibers or monofilament fibers having a density ranging from 0.050 to 0.065 lbs/in3 that are in a braided, woven, or two-dimensional laminate layup configuration.

8. The kit of claim 1, wherein the continuous fibers are further oriented in at least one of the transverse direction, the hoop direction and the out-of-plane direction.

9. The kit of claim 1, wherein the at least one of continuous fibers or discontinuous fibers oriented at least partially in the axial direction include at least 40 percent of the fibers oriented in the axial direction of the segmented leading edge.

10. The kit of claim 1, wherein the at least one of continuous fibers or discontinuous fibers comprise at least 25 wt. % of the segmented leading edge.

11. The kit of claim 1, wherein the at least two annular shaped fiber reinforced polymer composites have an outside diameter ranging from 0.25 inches to 3 inches and a wall thickness ranging from 0.050 inches to 0.250 inches.

12. The kit of claim 1, wherein the thermoset or thermoplastic resin matrix is selected from the group consisting of polyester, polyamide, acrylonitrile butadiene styrene, polylactic acid, polycarbonate, polyether ether ketone, polyethylene, polypropylene, and polyvinyl chloride, epoxy, phenolic, vinyl ester, polyurethane, silicone, and polyamide-imide.

13. The kit of claim 1, wherein the least two annular shaped fiber reinforced polymer composites further include a UV inhibitor, absorber or stabilizer.

14. The kit of claim 13, wherein the UV inhibitor, absorber or stabilizer is an additive to the composites or a coating applied to the outside surfaces of the composites.

15. The kit of claim 13, wherein the UV inhibitor, absorber or stabilizer is selected from the group consisting of carbon black, titanium dioxide, hydroxybenzophenone, hydroxyphenylbenzotriazole, oxanilides, benzophenones, benzotriazoles, hydroxyphenyltriazines, nickel quenchers and hindered amine light stabilizers (HALS).

16. The kit of claim 1 further including at least two luff grooves capable of being attached to the outside surface of the at least two annular shaped fiber reinforced polymer composites or are integral to the outside surface of the at least two annular shaped fiber reinforced polymer composites.

17. The kit of claim 16 further including an adhesive, mechanical fasteners, rivets, screws or high strength bonding tape for attaching the at least two luff grooves to the outside surface of the at least two annular shaped fiber reinforced polymer composites.

18. The kit of claim 16, wherein the at least two luff grooves are of a shape selected from the group consisting of annular, c-shaped, hollow square, hollow rectangular, and hollow triangular.

19. The kit of claim 1, wherein the segmented leading edge when coupled to a pool and/or spa cover is above the surface of the water in the pool and/or spa when the pool cover is in an open or closed position.

20. The kit of claim 1, wherein the segmented leading edge when coupled to a pool and/or spa cover is in the shape of a smile or a frown across the width of the pool and/or spa relative to the coping of the pool and/or spa and the surface of the water in the pool and/or spa.

21. The kit of claim 1, wherein the at least two annular shaped fiber reinforced polymer composites are made by a process selected from the group consisting of conventional 2-D layup, roll forming, pultrusion, single filament winding, vacuum bagging, extrusion, injection molding and resin transfer molding (RTM).

22. A method of reducing the deflection of a leading edge for a pool or spa cover comprising:
providing a pool or spa cover leading edge kit to a pool or spa site, the kit comprising: at least two annular shaped fiber reinforced polymer composites capable of being axially aligned and interconnected at abutting ends with each annular shaped fiber reinforced polymer composite having an axial length of from 3 feet to 20 feet, at least one joiner capable of interconnecting together a pair of axially aligned annular shaped fiber reinforced polymer composites at abutting axial ends to form a segmented leading edge with an axial length of from 6 feet to 50 feet that is capable of being coupled to a pool or spa cover, wherein the at least two annular shaped fiber reinforced polymer composites include at least one of continuous fibers or discontinuous fibers oriented at least partially in the axial direction and encapsulated by a thermoset or thermoplastic resin matrix;
assembling the leading edge kit at the pool or spa site to provide an assembled leading edge that is about equal in length to the width of the pool or spa cover;
coupling the assembled leading edge to the front end of the pool or spa cover;
wherein the assembled and coupled leading edge provides a deflection across the width of the pool or spa of from 0 to less than or equal to 0.10 inches per 10 feet of width of the pool or spa, and wherein the assembled and coupled leading edge has a linear weight per foot of from 4 to 14 ounces per foot of axial length.

23. The method of claim 22, wherein the at least one joiner is a solid or hollow cylinder having an axial length of from 5 inches to 12 inches.

24. The method of claim 22, wherein the at least one joiner is made from aluminum or a thermoplastic or thermoset material selected from the group consisting of polyester, polyamide, acrylonitrile butadiene styrene, polylactic acid, polycarbonate, polyether ether ketone, polyethylene, polypropylene, and polyvinyl chloride, epoxy, phenolic, vinyl ester, polyurethane, silicone, and polyamide-imide.

25. The method of claim 22, wherein the at least one joiner comprises a plug inside the pair of abutting axially aligned annular shaped fiber reinforced polymer composites with an outside diameter that is from 1 mil to 10 mil less than the inside diameter of the pair of abutting axially aligned annular shaped fiber reinforced polymer composites.

26. The method of claim 22, wherein the at least one joiner comprises a sleeve over the pair of abutting axially aligned annular shaped fiber reinforced polymer composites with an inside diameter that is from 1 mil to 10 mil greater than the outside diameter of the pair of abutting axially aligned annular shaped fiber reinforced polymer composites.

27. The method of claim 22, wherein the pool or spa cover leading edge kit further includes at least two luff grooves capable of being attached to the outside surface of the at least two annular shaped fiber reinforced polymer composites or are integral to the outside surface of the at least two annular shaped fiber reinforced polymer composites.

28. The method of claim 27, wherein the pool or spa cover leading edge kit further includes an adhesive, mechanical fasteners, rivets, screws or high strength bonding tape for attaching the at least two luff grooves to the outside surface of the at least two annular shaped fiber reinforced polymer composites.

29. The method of claim 22, wherein the assembled and coupled leading edge is above the surface of the water in the pool or spa when the pool or spa cover is in an open or closed position.

30. The method of claim 22, wherein the assembled and coupled leading edge is in the shape of a smile or a frown across the width of the pool or spa relative to the coping of the pool or spa and the surface of the water in the pool or spa.

* * * * *